(12) United States Patent
St.Clair et al.

(10) Patent No.: US 8,353,393 B2
(45) Date of Patent: Jan. 15, 2013

(54) OPERATOR INTERFACE CONTROLLABLE BRAKE WITH FIELD RESPONSIVE MATERIAL

(75) Inventors: Kenneth A. St.Clair, Cary, NC (US); Robert H. Marjoram, Holly Springs, NC (US)

(73) Assignee: Lord Corporation, Cary, NC (US)

( * ) Notice: Subject to any disclaimer, the term of this patent is extended or adjusted under 35 U.S.C. 154(b) by 637 days.

(21) Appl. No.: 12/520,757

(22) PCT Filed: Dec. 21, 2007

(86) PCT No.: PCT/US2007/088590
§ 371 (c)(1), (2), (4) Date: Jun. 22, 2009

(87) PCT Pub. No.: WO2008/080078
PCT Pub. Date: Jul. 3, 2008

(65) Prior Publication Data
US 2010/0051374 A1    Mar. 4, 2010

Related U.S. Application Data

(60) Provisional application No. 60/893,509, filed on Mar. 7, 2007, provisional application No. 60/871,610, filed on Dec. 22, 2006.

(51) Int. Cl.
*F16F 15/03* (2006.01)

(52) U.S. Cl. ......................................... 188/267; 188/161

(58) Field of Classification Search .............. 188/153 D, 188/151 R, 156–164, 267; 180/54.1; 701/36, 701/48; 74/473.18, 502.2
See application file for complete search history.

(56) References Cited

U.S. PATENT DOCUMENTS
2,575,360 A    11/1951    Rabinow
(Continued)

FOREIGN PATENT DOCUMENTS
DE    19848186 A1    4/2000
(Continued)

OTHER PUBLICATIONS

Emerald, et al., Allegro Microsystems, Inc., Innovation in Applications-Specific Hall-Effect Transducers Merges Direction-Detection Sensing With Velocity Signals, Technical Paper STP 97-8B, p. 1-8, 8 pages.
(Continued)

*Primary Examiner* — Christopher Schwartz
(74) *Attorney, Agent, or Firm* — Richard G. Miller

(57) ABSTRACT

A vehicle operator input device for controlling the vehicle with the operator input device including an operator interface lever moveable by a vehicle operator in first and second directions about an axis. The operator input device includes a sensor system with a sensor target. The sensor system senses the moveable operator interface lever and provides an operator interface lever position signal as a function of a position of the operator interface lever. The operator input device includes an interface lever controllable brake coupled to the operator interface lever, and a brake controller coupled to the sensor system for receiving the operator interface mechanism position signal and with the brake controller coupled to the brake for responsively transmitting a plurality of brake signals to the brake with the operator interface lever controllable brake responsively providing resistive braking forces to the operator interface lever for opposing a force applied to the operator interface lever by the operator, the operator interface lever controllable brake providing the resistive braking forces in response to controller brake signals, with the brake controller providing a first background force signal followed with a second below background force drop signal followed with a third above background stop force signal wherein the operator is provided with a mechanical detent sensation at a target lever location.

9 Claims, 14 Drawing Sheets

U.S. PATENT DOCUMENTS

| | | | |
|---|---|---|---|
| 2,663,809 | A | 12/1953 | Winslow |
| 2,741,702 | A | 4/1956 | Hore |
| 2,845,235 | A | 7/1958 | Wilcox |
| 2,939,560 | A | 6/1960 | Selden |
| 3,305,055 | A | 2/1967 | Slaughter |
| 3,618,720 | A | 11/1971 | Linke |
| 3,620,335 | A | 11/1971 | Hendershot et al. |
| 3,672,476 | A | 6/1972 | Hendershot |
| 3,680,671 | A | 8/1972 | Hendershot et al. |
| 3,994,178 | A | 11/1976 | Hore |
| 4,239,095 | A | 12/1980 | De Jong |
| 4,350,913 | A | 9/1982 | Eddens |
| 4,811,823 | A | 3/1989 | Raymond et al. |
| 4,829,352 | A | 5/1989 | Popovic et al. |
| 4,967,887 | A | 11/1990 | Annacchino et al. |
| 5,007,513 | A | 4/1991 | Carlson |
| 5,180,145 | A | 1/1993 | Watanabe et al. |
| 5,460,585 | A | 10/1995 | Gentry et al. |
| 5,530,345 | A | 6/1996 | Murari et al. |
| 5,598,908 | A | 2/1997 | York et al. |
| 5,721,566 | A | 2/1998 | Rosenberg et al. |
| 5,842,547 | A | 12/1998 | Carlson et al. |
| 5,845,752 | A | 12/1998 | Gopalswamy et al. |
| 5,848,678 | A | 12/1998 | Johnston et al. |
| 5,947,238 | A | 9/1999 | Jolly et al. |
| 6,053,291 | A | 4/2000 | Shibahata et al. |
| 6,117,093 | A | 9/2000 | Carlson |
| 6,152,272 | A | 11/2000 | Agnihotri et al. |
| 6,186,290 | B1 | 2/2001 | Carlson |
| 6,199,867 | B1 | 3/2001 | Mahoney et al. |
| 6,202,806 | B1 | 3/2001 | Sandrih et al. |
| 6,234,060 | B1 | 5/2001 | Jolly |
| 6,302,249 | B1 | 10/2001 | Jolly et al. |
| 6,339,419 | B1 | 1/2002 | Jolly et al. |
| 6,340,080 | B1 | 1/2002 | Carlson |
| 6,373,465 | B2 | 4/2002 | Jolly et al. |
| 6,424,245 | B1 | 7/2002 | Rector et al. |
| 6,427,813 | B1 | 8/2002 | Carlson |
| 6,580,269 | B2 | 6/2003 | Hiligsmann et al. |
| 6,826,979 | B2 | 12/2004 | Dybro |
| 6,854,573 | B2 * | 2/2005 | Jolly et al. ............ 188/267 |
| 6,904,823 | B2 | 6/2005 | Levin et al. |
| 6,917,867 | B2 | 7/2005 | Huang et al. |
| 7,032,726 | B2 | 4/2006 | Kuechler et al. |
| 7,046,000 | B1 | 5/2006 | Hara et al. |
| 7,198,140 | B2 * | 4/2007 | Jolly et al. ............ 188/267 |
| 2002/0023794 | A1 | 2/2002 | Pierce |
| 2003/0075401 | A1 | 4/2003 | Carlson |
| 2003/0079948 | A1 * | 5/2003 | Jolly et al. ............ 188/267 |
| 2005/0126871 | A1 * | 6/2005 | Jolly et al. ............ 188/267 |
| 2007/0181391 | A1 * | 8/2007 | St. Clair et al. ............ 188/267 |
| 2010/0051374 | A1 | 3/2010 | St.Clair et al. |
| 2010/0294603 | A1 * | 11/2010 | St. Clair et al. ............ 188/267 |

FOREIGN PATENT DOCUMENTS

| | | |
|---|---|---|
| DE | 102005052310 A1 | 7/2006 |
| EP | 0105806 A | 4/1984 |
| EP | 0450824 A1 | 10/1991 |
| WO | 20031036120 A | 5/2003 |
| WO | 20051095819 A1 | 10/2005 |
| WO | 20061084864 A1 | 8/2006 |
| WO | 20081080078 A2 | 7/2008 |

OTHER PUBLICATIONS

Melexis, MLX90316 Absolute Rotary Position Sensor IC Simplifies 360-Degree Rotary Position Applications, 2006, 26 pages.

Melexis, MLX90316 Rotary Position Sensor IC, Data Sheet, Oct. 4, 2005, p. 1-34, 34 pages.

Bilotti, et al., Allegro Microsystems, Inc., Product Description, Monolithic Magnetoc Hall Sensor Using Dynamic Quadrature Offset Cancellation, Technical Paper STP 97-10, 8 pages.

Joe Gilbert, Allegro Microsystems, Inc., Product Description, Technical Advances in Hall-Effect Sensing, Technical Paper STP 00-1, pp. 1-8, 8 pages.

Measurement Specialities, Customizing Sensor Technology for your Critical Applications, 2006, p. 23-24, 3 pages.

Danaher Motion, Torque Feedback Device: Cost Effective High Quality Tactile Interface, www.danahermotion.com, 2 pages.

Austria Microsystems, Tentative Fact Sheet, AS5043, 10 Bit Programmable 360 degree Magnetic Angle Encoder with Absolute Digital and Analog Outputs, Rev. 1.2, Apr. 11, 2005, 1 page.

Austria Microsystems, Fact Sheet, AS5035, Programmable 64 PPR Incremental Magnetic Rotary Encoder, Rev. 1.0, Apr. 14, 2005, 1 page.

Lord Corporation, Magneto-Rheological (MR) Technology, Tactile Feedback Device Product Bulletin, 2005, 2 pages.

Wikipedia, http://en.wikipedia.org/wiki/Detent—Definition of Detent, Nov. 22, 2006, 2 pages.

Wikipedia, http://en.wikipedia.org/wiki/Ball_detent—Definition of Ball Detent, Nov. 22, 2006, 1 page.

Carr Lane Manufacturing Co., Ball Detents, en_1408, Nov. 22, 2006, 2 pages.

* cited by examiner

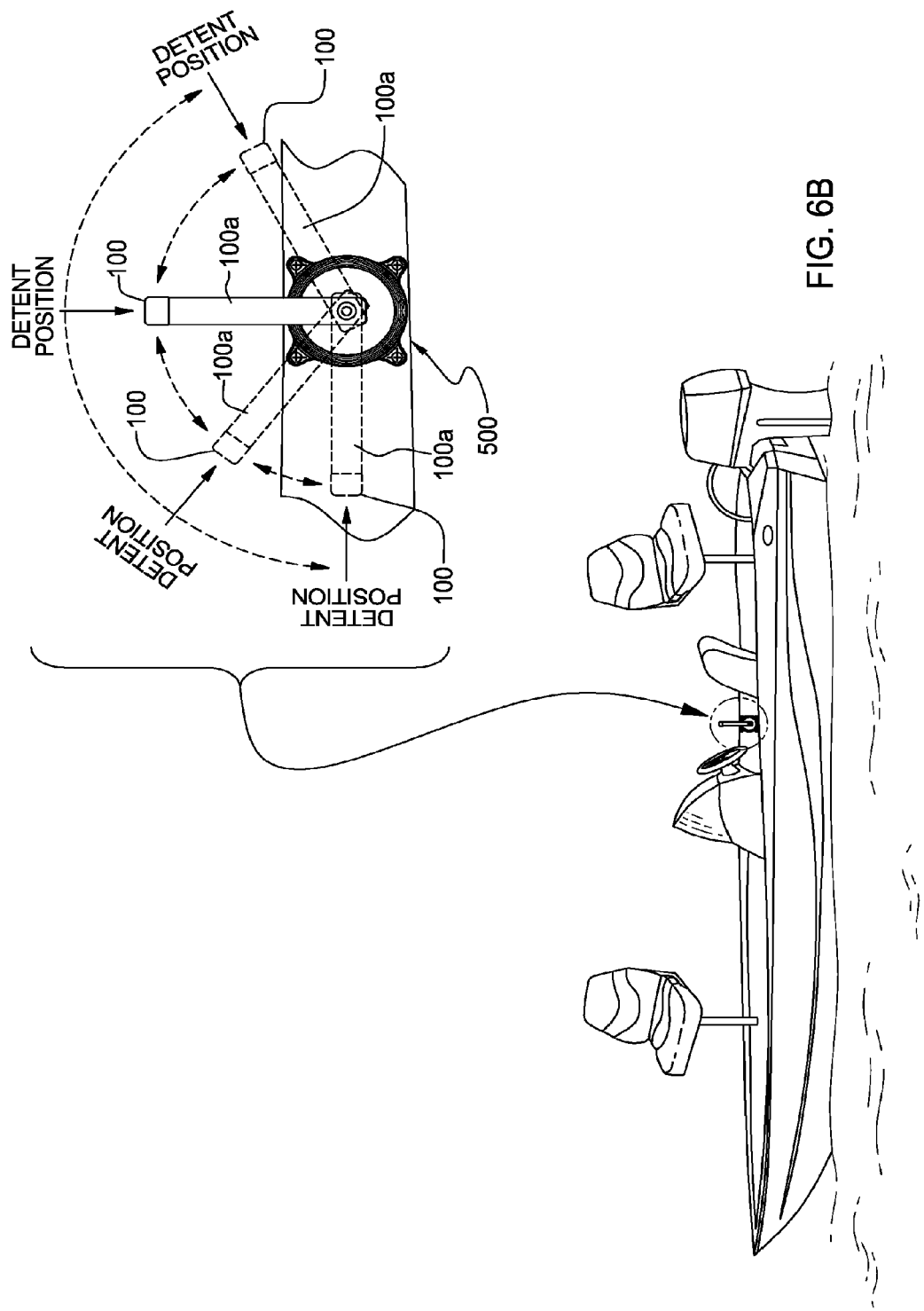

FIG. MULTIPLE (3) DETENT SENSATIONS WITH 180 DEGREE ROTATION OF INTERFACE LEVER ROTATING ABOUT BRAKE SHAFT AXIS

OPERATOR INTERFACE CONTROLLABLE BRAKE WITH FIELD RESPONSIVE MATERIAL

CROSS REFERENCE TO RELATED APPLICATIONS

The present application claims priority to U.S. Provisional Patent Application Ser. No. 60/893,509, filed Mar. 7, 2007, and to U.S. Provisional Patent Application Ser. No. 60/871, 610, filed Dec. 22, 2006, both of which are incorporated herein by reference.

SUMMARY OF THE INVENTION

In an embodiment the invention includes a vehicle with an operator input for controlling a vehicle operation with an operator interface lever with a controllable brake. The vehicle operator input includes a brake controller which provides a mechanical detent sensation.

In an embodiment the invention includes a controllable brake with a brake housing. The brake housing contains a controllable brake rotor with a shaft. The brake includes a controllable brake magnetic field generator proximate the controllable brake rotor for generating a controllable magnetic field strength. The brake includes a sensor system with a sensor target and a controllable brake electronics circuit board including a first electromagnetic noncontacting sensor monitoring the rotation of the controllable brake rotating sensor target and outputting a rotational position of the controllable brake rotating target and brake rotor. The controllable magnetic field strength generated by the controllable brake magnetic field generator is determined by the rotational position of the sensor target and the brake rotor to control a relative motion of the controllable brake rotor preferably with a first background force controllable magnetic field strength followed with a second below background force controllable magnetic field strength followed with a third above background stop force controllable magnetic field strength providing a mechanical detent sensation at a targeted rotational position.

Preferably the rotor brake force generated by the current fed to the controllable brake magnetic field generator electromagnetic coil utilizes the monitored position of the sensor target and the brake rotor to produce a mechanical ball detent feel at the targeted rotational position with a background base line force provided with a baseline magnetic field generator floor current followed with a second below background force dropped down magnetic field generator below floor near zero current followed with a third above background stop force controllable magnetic field strength current greater than the background baseline floor current.

In an embodiment the invention includes an operator input device. The operator input device including an operator interface operable by an operator, the operator interface being moveable in at least first and second directions along an axis. The operator input device including a position sensor system coupled to the operator interface for transmitting an operator interface position signal as a function of the position of the operator interface. The operator input device including a brake controller system coupled to the position sensor system for receiving an operator interface position signal and responsively transmitting a brake signal. The operator input device including a brake coupled to the brake controller system and the operator interface for receiving the brake signal and responsively applying a resistive force to the operator interface. The input device brake controller system preferably includes program instructions for providing a below background force drop signal followed with an above background stop force signal to provide a mechanical ball detent mechanism snap sensation at a target operator interface position, preferably with the below background force drop signal preceded with a first background force signal current floor.

In an embodiment the invention includes a method of providing a detent sensation. The method preferably includes providing a first background force signal. The method preferably includes providing a second below background force drop signal followed with a third above background stop force signal to provide a mechanical ball detent mechanism sensation at a targeted location.

In an embodiment the invention includes a method of operating a machine. The method of operating a machine preferably includes providing an operator interface lever. The method of operating a machine preferably includes providing an operator interface lever brake coupled with the operator interface lever. The method of operating a machine preferably includes providing a background force signal to the operator interface lever brake, the first background force signal followed with a below background force drop signal and an above background stop force signal to provide the operator interface lever with a mechanical detent sensation at a targeted operation location of the operator interface lever.

In an embodiment the invention includes a method of operating a vehicle machine. The method of operating the machine preferably includes providing an operator interface brake coupled with an operator positionable interface member. Preferably the operator positionable interface member is movable to machine operation positions to operate the machine, preferably with the member comprising a vehicle lever for controlling a machine operation. The method preferably includes providing a first background brake force with the operator interface brake, the first background brake force followed with a second below background brake force with the operator interface brake, the second below background brake force less than the first background brake force, the second below background brake force followed with a third above background stop brake force with the operator interface brake, the third above background brake force greater than the first background brake force to provide a detent mechanism snap sensation sensible by an operator moving the interface member at a targeted machine operation position of the operator interface member. Preferably the second below background force is a drop in brake force and a drop in the operator applied force needed to continue the movement of interface member by operator towards the target, preferably with the dropped force approaching zero, preferably with a near zero current brake drag force.

In an embodiment the invention includes a computer programmable media containing software to control a machine operator interface system. Preferably the computer software includes first program instructions for receiving sensor system position signals. Preferably the computer software includes second program instructions for monitoring the received sensor system position signals for an approaching targeted detent position signal. The computer software includes third program instructions for providing brake force signals related to the received sensor system position signals, preferably with a first background force output signal, followed with a second below background force drop output signal followed with a third above background stop force output signal to provide a detent sensation at a targeted machine operation detent position.

In an embodiment the invention includes a computer program product for controlling an operator input device with an operator interface force generator and a sensor system for sensing a plurality of positions of an operator interface member coupled with the operator interface force generator. Preferably the computer program product comprises a computer readable medium, first program instructions for monitoring the positions of the operator interface member, second program instructions to provide a first background force with the operator interface force generator, followed with a below background force with the operator interface force generator, followed with an above background force with the operator interface force generator to provide a mechanical ball detent sensation sensible by an operator moving the interface member at a monitored targeted position of the operator interface member.

In an embodiment the invention includes a controllable brake comprising an operator input movable member, the operator input movable member movable by an operator input motion. The controllable brake includes an operator input sensor system, the operator input sensor system sensing a position of the operator input movable member. Preferably the controllable brake includes an electromagnetic brake member. Preferably the controllable brake includes a means for controlling the electromagnetic brake member in order to produce a mechanical detent sensation.

In an embodiment the invention includes a machine operation input device. Preferably the machine operation input device includes a movable operator interface member and an electromagnetic operator interface sensor system for sensing a plurality of operator interface member positions. Preferably the machine operation input device includes a means for providing a mechanical ball detent sensation when the movable operator interface member is moved to a targeted operator interface member location.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principals and operation of the invention.

DETAILED DESCRIPTION OF THE PREFERRED EMBODIMENTS

Figure 1A:
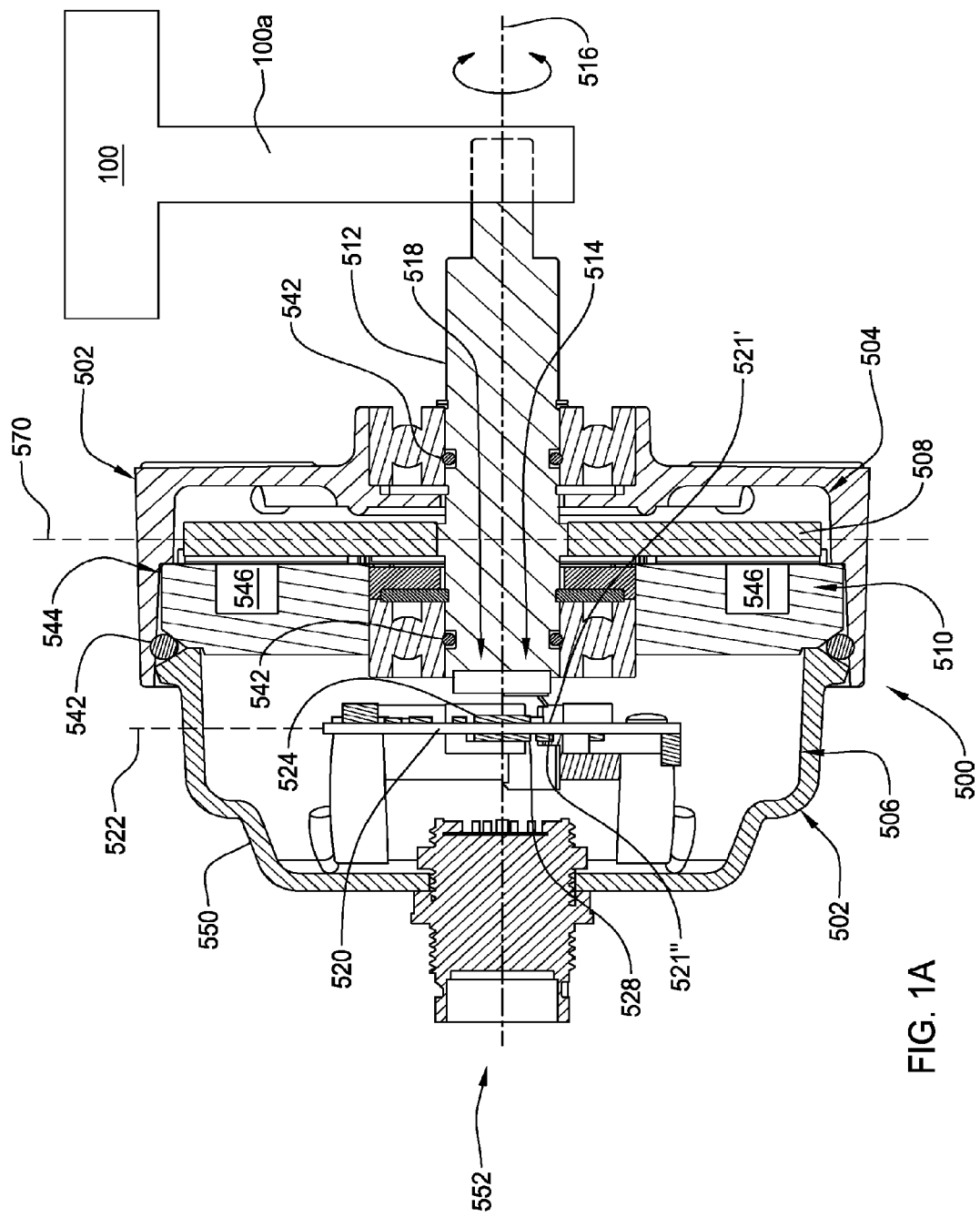
FIG. 1A-B show cross section views of an operator interface controllable brake device.
Figure 1B:
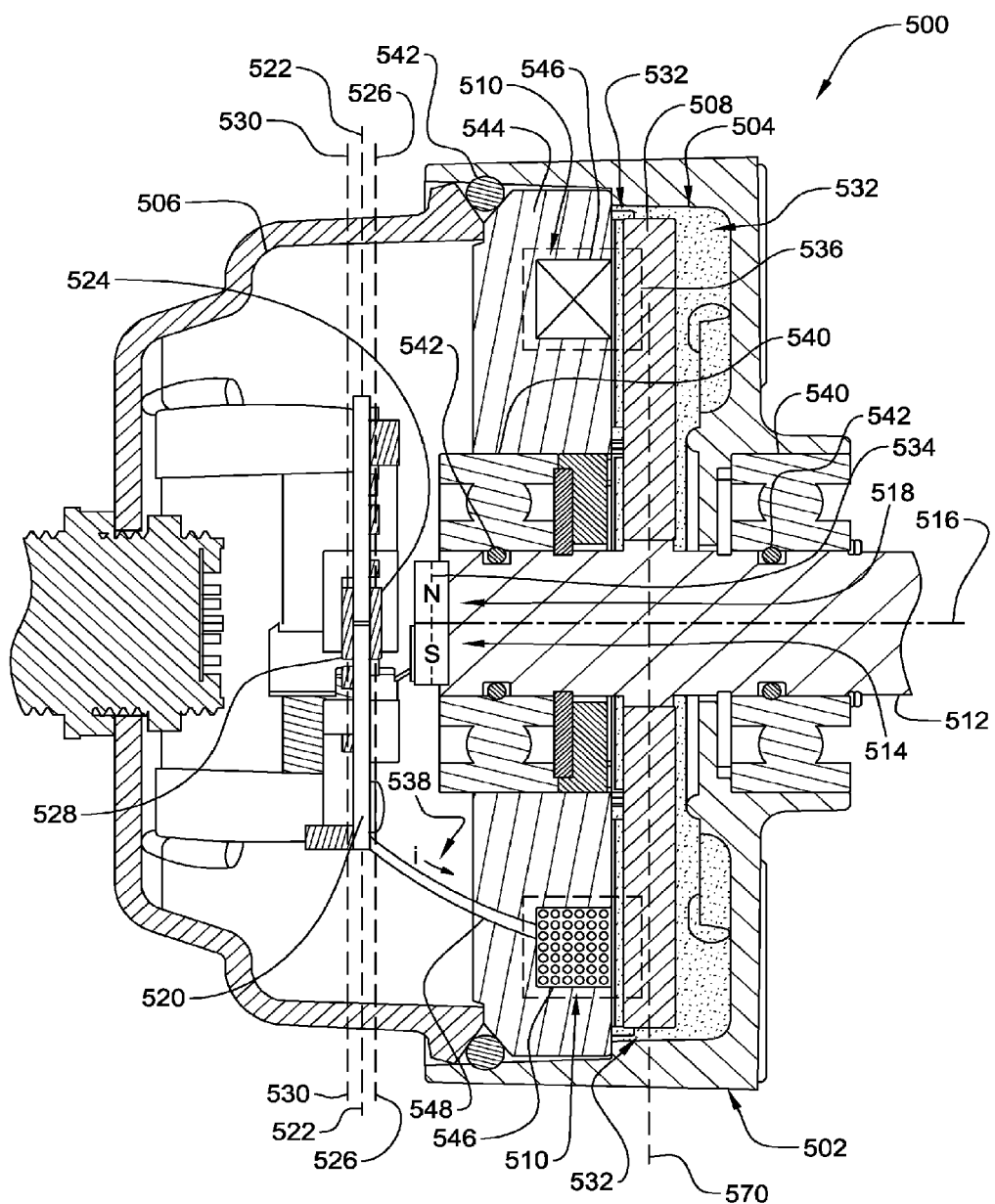
Figure 2A:
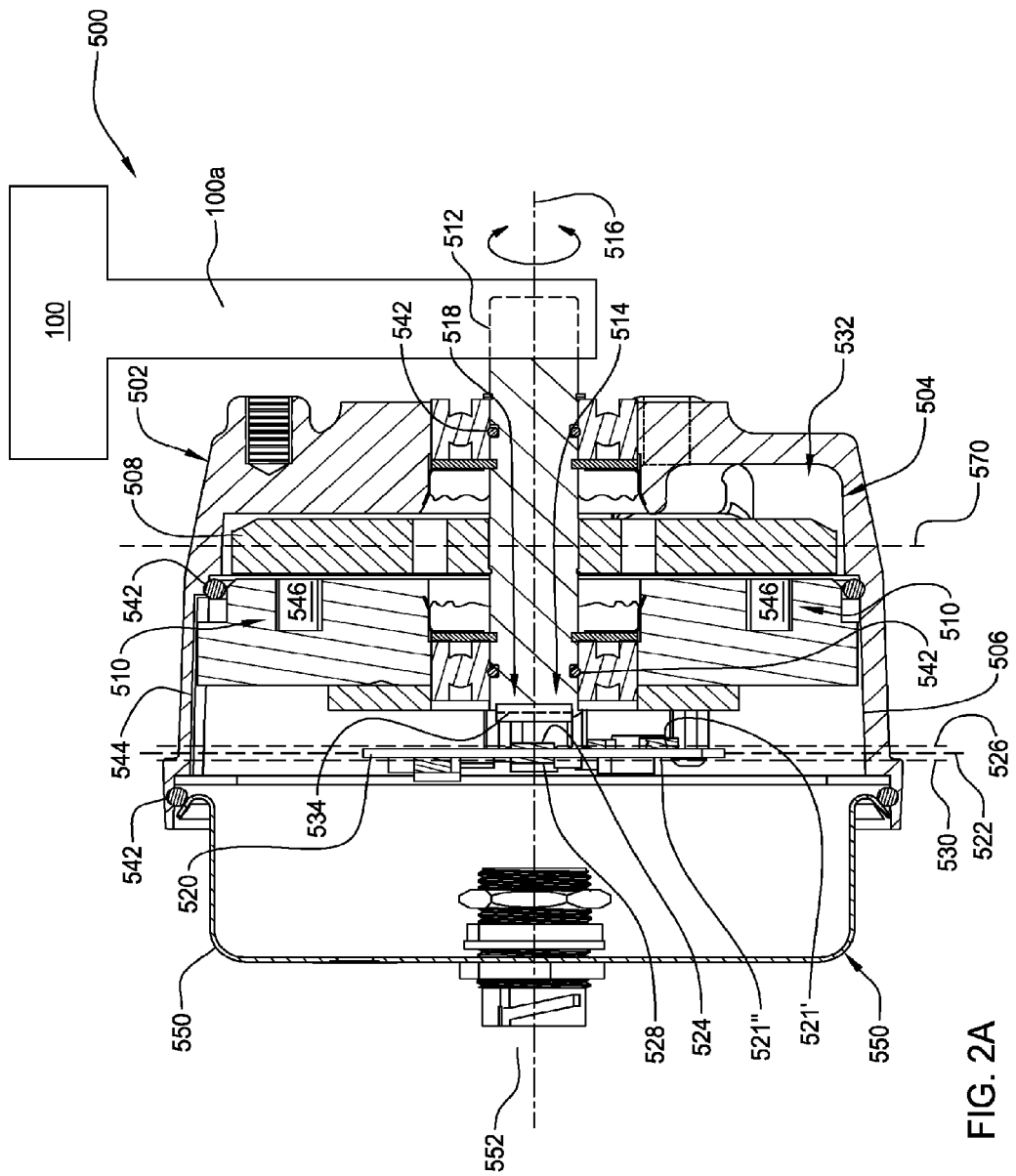
FIG. 2A-B show cross section views of an operator interface controllable brake device.
Figure 2B:
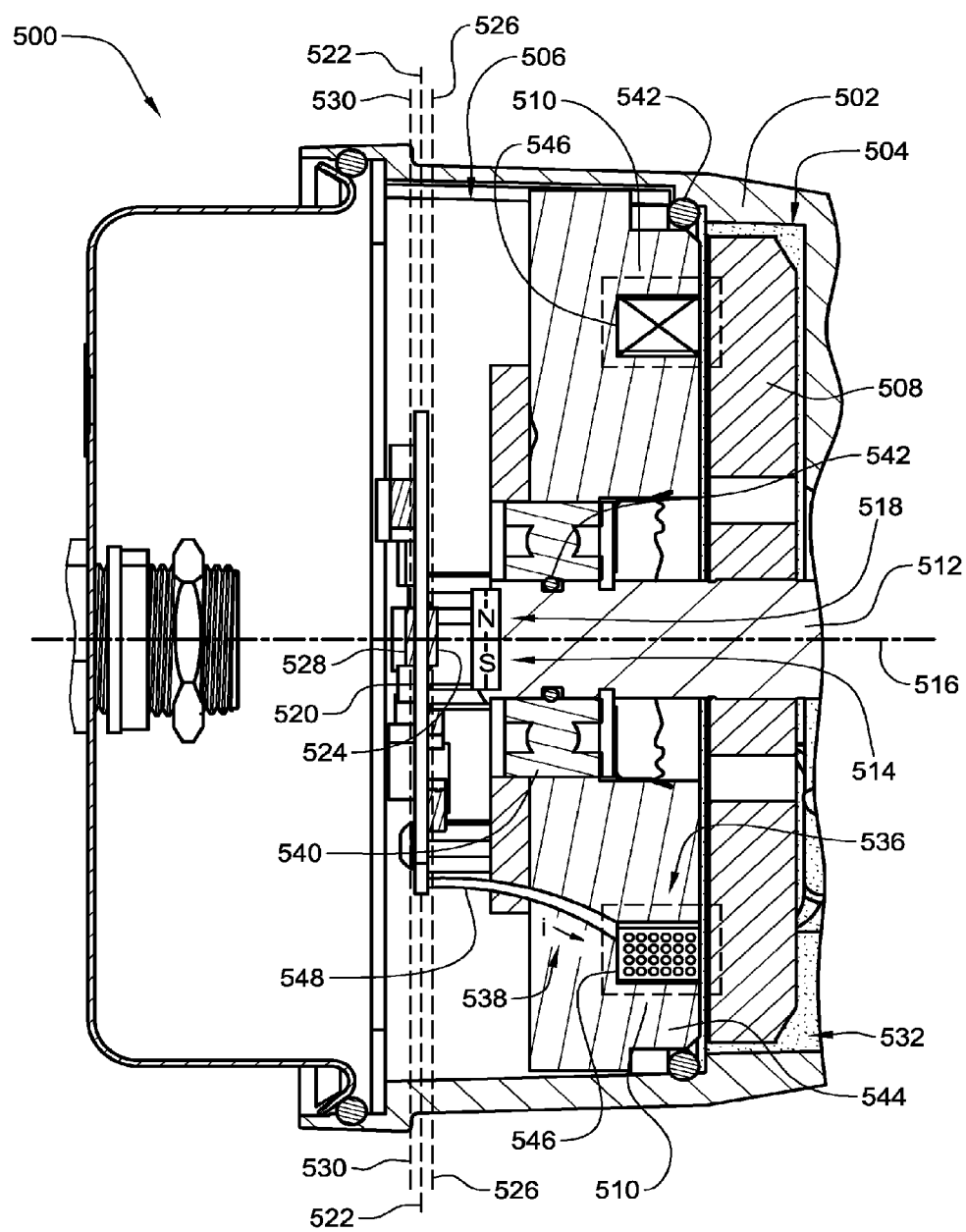
Figure 2C:
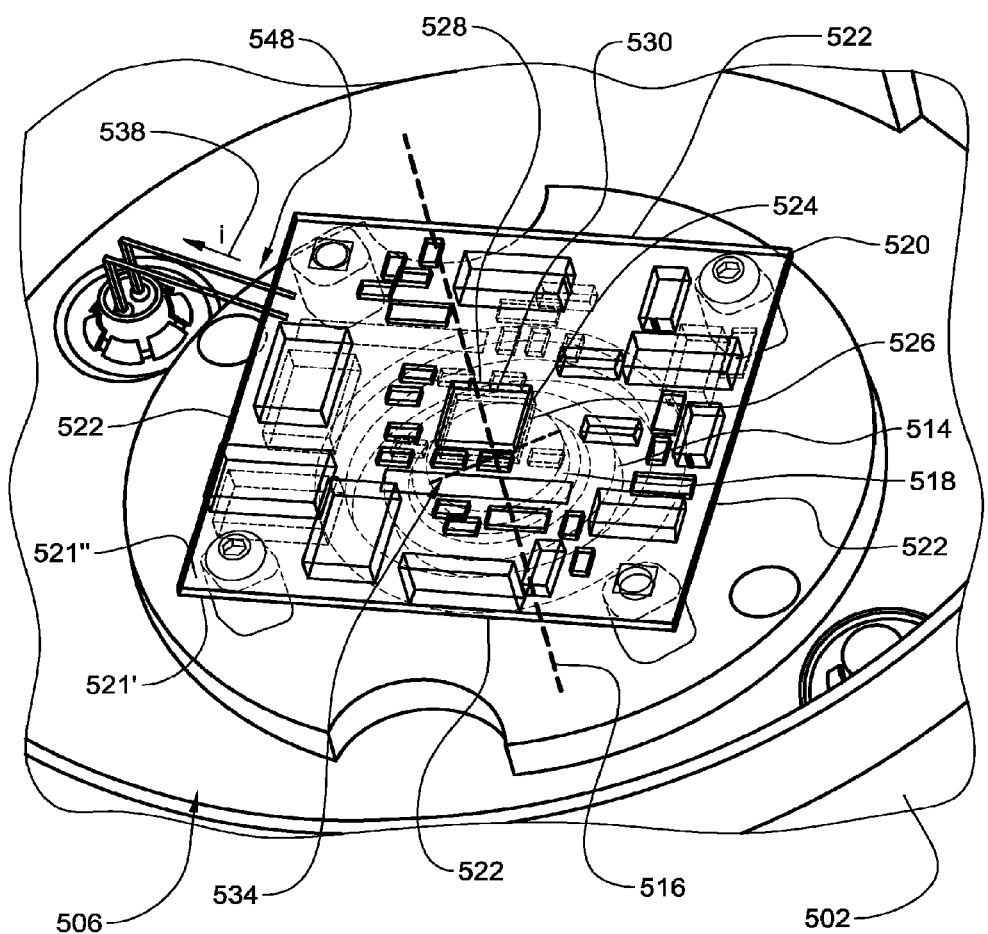
FIG. 2C shows a view of an operator interface controllable brake with the circuit board illustrated transparently to show electronic noncontacting magnetic sensors oriented on both sides of the circuit board.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

In an embodiment the invention includes a vehicle. The vehicle preferably includes an operator input device for controlling the vehicle, the operator input device including an operator interface mechanism for a vehicle operation function. Preferably the operator interface mechanism is operable by an operator, preferably with the operator interface mechanism comprising a lever. Preferably the operator interface lever is moveable by a vehicle operator in at least a first direction and at least a second direction about an axis. Preferably the operator input device includes a sensor system including a sensor target, the sensor system for sensing the moveable operator interface lever. Preferably the sensor system includes an electronic noncontacting magnetic sensor, preferably two electromagnetic sensors opposingly mounted on the two sides of a sensor system circuit board. Preferably the sensor system target comprises a controllable brake rotating magnetic sensor target, with the target coupled to the operator interface mechanism lever for sensing the moveable operator interface lever. The sensor system outputs and transmits an operator interface lever position signal as a function of a position of the operator interface lever. Preferably an operator interface lever controllable brake is coupled to the operator interface lever. Preferably a brake controller is coupled to the sensor for receiving the operator interface mechanism position signal, with the brake controller coupled to the brake for responsively transmitting a plurality of brake signals to the brake with the operator interface lever controllable brake responsively providing a plurality of resistive braking forces to the operator interface lever for opposing a force applied to the operator interface lever by the operator, the operator interface lever controllable brake providing the resistive braking forces in response to a plurality of controller brake signals. Preferably, the brake controller provides a first background force signal floor current followed with a second below background force drop signal, followed with a third above background stop force signal wherein the operator is provided with a mechanical detent sensation at a target lever location. Preferably the second below background force drop signal comprises a current drop below the floor current, preferably to a near zero current level centered about zero. Preferably the third above background stop force signal comprises a high current level above the floor current which provides a substantial resistance to the lever motion after the force drop below the background force. Preferably the operator interface lever controllable brake includes a controllable brake magnetic field generator electromagnet. The controllable brake magnetic field generator generating a controllable magnetic field from a brake controller electrical current, with the first background force signal comprised a background EM coil electrical current level, the second below background force drop signal comprised of a second EM coil electrical current level less than the background electrical current level, and the third above background stop force signal comprised of a third EM coil electrical current level greater than the background electrical current level. Preferably the second below background force drop signal is provided when approaching the target lever location and is not provided when receding from the target lever location.

In an embodiment the invention includes a controllable brake with a housing comprising a first chamber and a second chamber, a shaft, the shaft extending through the first chamber and the second chamber with an axis of rotation, the shaft having a first shaft end, a controllable brake rotor made integral with the shaft, the rotor housed in the first chamber. The brake preferably includes a controllable brake magnetic field generator located in the first chamber proximate the controllable brake rotor, the controllable brake magnetic field generator for generating a controllable magnetic field strength, and a controllable brake rotating magnetic target integral with the shaft proximate the first shaft end, the controllable brake rotating magnetic target housed in the second chamber, and a controllable brake electronics circuit board mounted in the second chamber, the controllable brake electronics circuit board having a control board plane, the control board plane oriented normal to the axis of rotation and including a first electronic noncontacting magnetic sensor having a first sensor plane, the first electronic noncontacting magnetic sensor integrated on the controllable brake electronics circuit board with the first sensor plane parallel with the control board plane, a second electronic noncontacting magnetic sensor having a second sensor plane, the second electronic noncontacting magnetic sensor integrated on the controllable brake electronics circuit board with the second sensor plane parallel with the control board plane with the control board plane between the first sensor plane and the second sensor plane. Preferably the first electromagnetic noncontacting sensor, and preferably the second electronic noncontacting magnetic sensor, monitoring the rotation of the controllable brake rotating magnetic target and outputting a rotational position of the controllable brake rotating magnetic target with the controllable magnetic field strength generated by the controllable brake magnetic field generator determined by the rotational position to control a relative motion of the controllable brake rotor. Preferably brake is controlled with a first background force controllable magnetic field strength, preferably a base line force provided with a baseline magnetic field generator current signal, preferably with a floor current, followed with a second below background force controllable magnetic field strength, preferably a dropped down magnetic field generator current signal with force and a magnetic field less than the background. Preferably the second below background force current is approaching zero, prefer about zero, preferably a basement zero current level below the current floor. Preferably the second below background force is followed with a third above background stop force controllable magnetic field strength, preferably with a magnetic field generator current signal with a maximum force and magnetic field greater than the background baseline floor current, providing a mechanical ball detent mechanism snap sensation at a targeted rotational position. Preferably the controllable magnetic field strength is provided from a brake controller electrical current, with the first background force controllable magnetic field strength provided from a background EM coil electrical current level, the second below background force controllable magnetic field strength includes of a second EM coil electrical current level less than the background electrical current level, and the third above background stop force controllable magnetic field strength includes a third EM coil electrical current level greater than the background electrical current level. Preferably the second below background force controllable magnetic field strength is provided when approaching the targeted rotational position and is not provided when receding from the targeted rotational position. Preferably the controllable brake includes a lever, with the lever coupled with the brake rotor shaft, preferably with the lever comprised of a vehicle operation lever. In a preferred embodiment the controllable brake vehicle operation lever is a throttle lever. In a preferred embodiment the controllable brake vehicle operation lever is a gear shift lever. Preferably the brake provides a plurality of mechanical ball detent mechanism snap sensations at a plurality of targeted rotational positions, preferably spaced out rotational positions, preferably programmable positions which can be predetermined positions that can be reprogrammed to new programmed positions.

In an embodiment the invention includes an operator input device, the operator input device including an operator interface operable by an operator, the operator interface being moveable in at least first and second directions along an axis. The operator input device includes a position sensor system coupled to the operator interface for transmitting an operator interface position signal as a function of the position of the operator interface. The operator input device includes a brake controller system coupled to the position sensor system for receiving an operator interface position signal and responsively transmitting a brake signal. The operator input device includes a brake coupled to the brake controller system and the operator interface for receiving the brake signal and responsively applying a resistive brake force to the operator interface, with the brake controller system providing a first background force signal followed with a second below background force drop signal followed with a third above background stop force signal to provide a mechanical ball detent mechanism snap sensation at a target operator interface position. Preferably the operator interface includes a handle 100 and a rotating shaft coupled to the handle 100, preferably a vehicle operation lever 100a. In a preferred embodiment the vehicle operation lever is a throttle lever. In a preferred embodiment the vehicle operation lever is a gear shift lever. Preferably the detent sensation is provided with respect to a programmable position of the operator interface. Preferably the brake controller system provides a first background EM coil electrical current level, a second EM coil electrical current level less than the background electrical current level, and a third EM coil electrical current level greater than the background electrical current level. Preferably the second EM coil electrical current level is less than the background electrical current level and is provided when approaching the targeted position and is not provided when receding from the targeted position. Preferably the brake controller system provides a plurality of mechanical ball detent mechanism snap sensations at a plurality of targeted positions, preferably spaced out rotational positions, preferably programmable positions.

In an embodiment the invention includes a method of providing a detent sensation. Preferably the method of providing a detent sensation includes providing a first background force signal followed with a second below background force drop signal, and the second below background force drop signal followed with a third above background stop force signal to provide a mechanical ball detent mechanism snap sensation at a targeted location. Preferably the first background force signal, the second below background force drop signal, and the third above background stop force signal are transmitted to a controllable magnetic field strength brake as a brake controller electrical current, with the first background force signal a background EM coil electrical current level, the second below background force signal a second EM coil electrical current level less than the background electrical current level, and the third above background stop force signal a third EM coil electrical current level greater than the background electrical current level. Preferably the detent sensation is provided with respect to a programmable position of an operator interface. Preferably the second EM coil electrical current level less than the background electrical current level is provided when approaching the targeted position and is not provided when receding from the targeted position.

In an embodiment the invention includes a method of operating a vehicle machine. Preferably the method of operating a machine includes providing an operator interface lever, providing an operator interface lever brake coupled with the operator interface lever, providing a first background force signal to the operator interface lever brake, the first background force signal followed with a second below background force drop signal and a third above background stop force signal to provide the operator interface lever with a mechanical ball detent mechanism snap sensation at a targeted operation location of the operator interface lever. Preferably the first background force signal, the second below background force drop signal, and the third above background stop force signal are transmitted to the brake as a brake controller electrical current, with the first background force signal a background EM coil electrical current level, the second below background force signal a second EM coil electrical current level less than the background electrical current level, and the third above background stop force signal a third EM coil electrical current level greater than the background electrical current level.

Preferably the detent sensation is provided with respect to a programmable position of the operator interface lever. Preferably the second EM coil electrical current level less than the background electrical current level is provided when approaching the targeted operation location and is not provided when receding from the targeted location.

In an embodiment the invention includes a method of operating a vehicle machine. Preferably the method of operating a machine includes providing an operator interface brake coupled with an operator positionable interface member, preferably with the member movable to machine operation positions to operate the machine, preferably a vehicle lever for controlling a machine function. Preferably the method includes providing a first background brake force with the operator interface brake, the first background brake force followed with a second below background brake force. Preferably the below background brake force is a drop in force needed to continue movement of interface member by operator, preferably approaching zero, preferably with zero as the no current brake drag force. The second below background brake force is less than the first background brake force, the second below background brake force followed with a third above background stop brake force with the operator interface brake. The third above background stop brake force is greater than the first background brake force. The intervening below background brake force preferably provides a mechanical ball detent mechanism snap sensation sensible by an operator moving the interface member at a targeted machine operation position of the operator interface member. Preferably the operator interface brake includes an electromagnetic coil fed with a brake controlling electrical current, the first background brake force provided with a first background EM coil electrical current level, the second below background brake force provided with a second EM coil electrical current level less than the background electrical current level, and the third above background stop brake force provided with a third EM coil electrical current level greater than the background electrical current level. Preferably the detent sensation is provided with respect to a programmable position of the operator interface member. Preferably the second EM coil electrical current level less than the background electrical current level is provided when approaching the targeted machine operation position and is not provided when receding from the targeted machine operation position.

In an embodiment the invention includes a computer programmable media containing programmable software to control a machine operator interface system. Preferably the computer programmable software includes first program instructions for receiving sensor system position signals. Preferably the computer programmable software includes second program instructions for monitoring the received sensor system position signals for an approaching targeted detent position signal. Preferably the computer programmable software includes third program instructions for providing brake force signals related to the received sensor system position signals, with preferably a first background force output signal, followed with a second below background force drop output signal followed with a third above background stop force output signal to provide a mechanical detent sensation at a targeted machine operation detent position. Preferably the computer software includes receding program instructions wherein a below background force drop output signal is not outputted when receding from the targeted machine operation detent position. Preferably the computer software utilizes sensor system position signals to provide a control input into a machine operation control algorithm, preferably with sensor position signals used in addition to a detent location input also used to operate the machine, such as position controlling a vehicle throttle an/or vehicle power transmission.

Preferably the computer software programmable media includes detent establishment program instructions for establishing a user programmable position for the targeted machine operation detent position. Preferably the computer software programmable media includes program instructions for providing a plurality of monitored targeted machine operation positions and providing a mechanical ball detent mechanism snap sensation at the monitored targeted machine operation positions. Preferably the computer software programmable media includes angle monitoring program instructions for monitoring an angular position of a sensor target. Preferably the computer software programmable media includes predetermined data look up table program instructions for providing an electromagnetic current level correlated with a monitored position of the operator interface system. Preferably the computer software programmable media includes monitored position input force generator output program instructions for providing a force generator brake controller signal as a function of a monitored position of the operator interface system.

In an embodiment the invention includes a computer program product for controlling an operator input device with an operator interface brake force generator and a sensor system for sensing a plurality of positions of an operator interface member coupled with the operator interface brake force generator. The computer program product includes a computer readable medium, first program instructions for monitoring the positions of the operator interface member, second program instructions to provide a first background brake force with the operator interface brake force generator, followed with a second below background brake force, preferably a drop in force needed to continue movement of the interface member by the operator, preferably approaching zero, preferably with zero as the no current brake drag force with the second below background brake force less than the first background brake force, followed with a third above background stop brake force with the operator interface brake force generator, with the third above background stop brake force preferably greater than the first background brake force to provide a mechanical ball detent mechanism snap sensation sensible by an operator moving the interface member at a monitored targeted machine operation position of the operator interface member. Preferably the computer program product includes program instructions for establishing a user programmable position for the monitored targeted machine operation position. Preferably the computer program product includes direction monitoring program instructions for monitoring an approaching directional movement towards the monitored targeted machine operation position and for monitoring a receding directional movement away from the monitored targeted machine operation position, wherein the second below background force drop signal is provided when approaching the monitored targeted machine operation position and is not provided when receding from the monitored targeted machine operation position. Preferably the computer program product includes program instructions for providing a plurality of monitored targeted machine operation positions and providing a mechanical detent mechanism snap sensation at the monitored targeted machine operation positions. Preferably the computer program product includes angle monitoring program instructions for monitoring an angular position of a sensor target. Preferably the computer program product includes look up table program instructions for providing an electromagnetic current level correlated with a monitored position of the operator interface member. Preferably the computer program product includes monitored position input force generator output program instructions for providing a force generator controller brake signal as a function of a monitored position of the operator interface member.

In an embodiment the invention includes a controllable brake comprising an operator input movable member, the operator input movable member movable by an operator input motion, the controllable brake including an operator input sensor system, the operator input sensor system sensing a position of the operator input movable member, the controllable brake including an electromagnetic brake member, and the controllable brake including a means for controlling the electromagnetic brake member in order to produce a mechanical detent sensation.

In an embodiment the invention includes a machine operation input device, the machine operation input device including a movable operator interface member and an electromagnetic operator interface sensor system for sensing a plurality of operator interface member positions, wherein the machine operation input device includes a means for providing a mechanical ball detent sensation when the movable operator interface member is moved to a targeted operator interface member position.

In an embodiment the invention provides the feel of a mechanical ball detent by causing the braking torque to reduce to near zero for a short detent force drop distance preceding the desired stop point, where current rises to a relatively high stop force level. The near zero torque dropout is preferably direction sensitive. Preferably the zero torque dropout is produced only as the operator interface lever approaches the detent stop point target, and preferably not as the operator interface lever leaves the detent stop point target.

In an embodiment the detent sensation is provided with a controllable brake which cannot add energy to the system. In preferred embodiments the detent sensation is provided with the controllable brake in a control-by-wire vehicle machine systems for vehicle operations such as braking, throttle, and shifting while giving the mechanical detent sensation to the operator by using such simulated mechanical ball detent force feedback, with a snap such felt by an operator with an actual mechanical ball detent mechanism. In a preferred embodiment the detent sensation is provided with the controllable brake in a control-by-wire marine vehicle machine system for operating a marine vehicle, preferably with the operator interface lever controlling the direction (forward/reverse) and speed (throttle) of a marine vehicle motor.

In an embodiment a non-zero current floor is utilized over the majority of the lever positionable range to provide a background force. Then, as the lever approaches the target, current is dropped towards zero (preferably near zero current centered about zero) with the lever allowed to momentarily accelerate towards the target. Then the current is increased to a high current level at the target location, preferably with the high current level at the target location greater than the non-zero current floor. The near-zero force preceding a high force combination preferably provides a mechanical ball detent sensation feel of a snap going into the detent position. Preferably the near zero current is used only on approach to the target point, and not when leaving the target point. The FIG. multiple detent sensations with 180 degree rotation of interface lever rotating about brake shaft axis provides a data chart for a look-up-table program instruction approach that is used in an embodiment, with the solid blue line for increasing lever angle and the dashed red line is for decreasing lever angle to provide mechanical ball detent sensations at the three programmed target positions of 3000, 4000, and 5000. In addition to program instructions with a look-up-table, detent sensations are providable with code function program instruction that when approaching the target position generate the detent commands of brake control signals for the background force followed by the below background force drop followed with the greater than background stop force. In an embodiment the code function provides a greater than zero ramped up floor current preceding the near zero current force dropout and the high current greater than background stop force to give the snap.

The controllable brakes preferably include a housing including a first chamber and a second chamber. The controllable brake preferably includes a shaft, the shaft extending through the first chamber and the second chamber with an axis of rotation, the shaft having a first shaft end. The controllable brake preferably includes a controllable brake rotor made integral with the shaft, the rotor housed in the first chamber. The controllable brake preferably includes a controllable brake magnetic field generator located in the first chamber proximate the controllable brake rotor, the controllable brake magnetic field generator for generating a controllable magnetic field strength. The controllable brake preferably includes a controllable brake rotating magnetic target integrated with the shaft proximate the first shaft end, the controllable brake rotating magnetic target housed in the second chamber. The controllable brake preferably includes a controllable brake electronics circuit board mounted in the second chamber, the controllable brake electronics circuit board having a control board plane, the control board plane oriented normal to the shaft axis of rotation. The controllable brake preferably includes a first electronic noncontacting magnetic sensor having a first sensor plane, the first electronic noncontacting magnetic sensor integrated on the controllable brake electronics circuit board with the first sensor plane parallel with the control board plane. The controllable brake preferably includes a second electronic noncontacting magnetic sensor having a second sensor plane, the second electronic noncontacting magnetic sensor integrated on the controllable brake electronics circuit board with the second sensor plane parallel with the control board plane with the control board plane between the first sensor plane and the second sensor plane, the first electronic noncontacting magnetic sensor and the second electronic noncontacting magnetic sensor monitoring the rotation of the controllable brake rotating magnetic target and outputting a rotational position of the controllable brake rotating magnetic target wherein the controllable magnetic field strength generated by the controllable brake magnetic field generator is determined by the rotational position to control a relative motion of the controllable brake rotor.

The controllable brakes preferably include a rotating magnetic target. The controllable brake preferably includes a magnetically permeable rotor. The controllable brake preferably includes a shaft connected to the magnetically permeable rotor. The controllable brake preferably includes a housing having a first housing chamber rotatably housing the magnetically permeable rotor therein, and including a magnetic field generator spaced from the magnetically permeable rotor, and configured and positioned for generating a controllable magnetic field to control a relative motion of the magnetically permeable rotor, and a second housing chamber containing control electronics therein, the second housing chamber electronics including at least a first oriented electronic noncontacting magnetic sensor, the at least first oriented electronic noncontacting magnetic sensor oriented relative to the rotating magnetic target and the shaft wherein the at least first oriented electronic noncontacting magnetic sensor monitors the rotation of the rotating magnetic target.

The methods preferably include providing a housing having a first housing chamber and a second housing chamber. The method preferably includes providing a shaft with a magnetically permeable rotor, the shaft including a rotating magnetic target distal from the magnetically permeable rotor. The method preferably includes providing a magnetic field generator for generating a magnetic field with a controllable field strength for controlling a relative motion of the magnetically permeable rotor. The method preferably includes providing at least a first electronic noncontacting magnetic sensor, the at least first electronic noncontacting magnetic sensor integrated on an operation electronic control board having a control board plane. The method preferably includes disposing the magnetically permeable rotor and the magnetic field generator in the first housing chamber. The method preferably includes disposing the rotating magnetic target and the at least a first electronic noncontacting magnetic sensor in the second housing chamber, wherein the operation electronic control board is in electrical communication with the magnetic field generator and the control board plane is oriented relative to the rotating magnetic target, wherein the at least first electronic noncontacting magnetic sensor provides a detected measured rotational position of the rotating magnetic target with the controllable field strength generated in relationship to the detected measured rotational position sensed by the at least first electronic noncontacting magnetic sensor.

The methods preferably include providing a magnetic field generator for generating a magnetic field with a controllable field strength for controlling a relative motion of a movable brake member. The method preferably includes providing a magnetic target which moves with the relative motion of the movable brake member. The method preferably includes providing an electronic circuit board having a circuit board plane, a first oriented electronic noncontacting magnetic sensor having a first oriented sensor plane, the first electronic noncontacting magnetic sensor integrated on the electronic circuit board with the first sensor plane parallel with the circuit board plane, a second oriented electronic noncontacting magnetic sensor having a second oriented sensor plane, the second electronic noncontacting magnetic sensor integrated on the electronic circuit board with the second sensor plane parallel with the circuit board plane with the circuit board plane between the second sensor plane and the first sensor plane. The method preferably includes disposing the electronic circuit board proximate the magnetic target wherein the first electronic noncontacting magnetic sensor and the second electronic noncontacting magnetic sensor provide a detected measured magnetic target position with the controllable field strength generated by the magnetic field generator determined by the detected measured magnetic target position.

The methods preferably include providing a control system rotating magnetic target having an axis of rotation. The method preferably includes providing a control system electronic circuit board having a circuit board plane and a first circuit board side and an opposite second circuit board side, a first oriented electronic noncontacting magnetic sensor integrated on the electronic circuit board first circuit board side, a second oriented electronic noncontacting magnetic sensor integrated on the electronic circuit board second circuit board side. The method preferably includes disposing the control system electronic circuit board proximate the control system rotating magnetic target with a projected extension of the axis of rotation extending through the first oriented electronic noncontacting magnetic sensor and the second oriented electronic noncontacting magnetic sensor wherein the first electronic noncontacting magnetic sensor and the second electronic noncontacting magnetic sensor provide a plurality of detected measured magnetic target rotary position outputs.

The methods preferably include providing a magnetic field generator for generating a magnetic field with a controllable field strength. The method preferably includes providing a field responsive controllable material, the field responsive controllable material affected by the magnetic field generator magnetic field. The method preferably includes providing a magnetic target. The method preferably includes providing at least a first electronic noncontacting magnetic sensor, the at least first electronic noncontacting magnetic sensor integrated on an operation electronic control board having a control board plane, the operation electronic control board in electrical communication with the magnetic field generator and the control board plane oriented relative to the magnetic target, wherein the at least a first electronic noncontacting magnetic sensor provides a detected measured position of the magnetic target with the controllable field strength generated in relationship to the detected measured position sensed by the at least first electronic noncontacting magnetic sensor.

Preferably the controllable brake includes a housing comprising a rotor chamber and a sensor chamber, a shaft, the shaft extending through the rotor chamber and the sensor chamber with an axis of rotation, the shaft having a shaft end, a controllable brake rotor made integral with the shaft, the rotor housed in the rotor chamber, the rotor having a rotation plane, a controllable brake magnetic field generator located in the rotor chamber proximate the controllable brake rotor, the controllable brake magnetic field generator for generating a controllable magnetic field strength, and a controllable brake rotating magnetic target proximate the shaft end, the controllable brake rotating magnetic target housed in the sensor chamber, and a controllable brake first electronic noncontacting magnetic sensor having a first sensor plane, the first electronic noncontacting magnetic sensor mounted in the sensor chamber with the first sensor plane parallel with the controllable brake rotor rotation plane, the first electronic noncontacting magnetic sensor monitoring the rotation of the controllable brake rotating magnetic target and the controllable brake rotor and simultaneously outputting at least two rotational positions of the controllable brake rotor wherein the controllable magnetic field strength generated by the controllable brake magnetic field generator is determined with the rotational positions to control a relative motion of the controllable brake rotor.

Preferably the electronic noncontacting electromagnetic sensor preferably comprises an integrated circuit semiconductor sensor chip with at least two positional outputs. Preferably the electronic noncontacting magnetic sensor integrated circuit semiconductor sensor chip has at least two dies. Preferably the at least two dies are ASICs (Application Specific Integrated Circuits). In a preferred embodiment the at least two dies are side by side dies in the integrated circuit semiconductor sensor chip. In a preferred embodiment the at least two dies are vertically stacked dies in the integrated circuit semiconductor sensor chip. In a preferred embodiment the integrated circuit semiconductor sensor chip ASIC die include a magnetoresistive material, preferably with electrical resistance changes in the presence of the magnetic target magnetic field, preferably with magnetoresistive elements arranged in a Wheatstone bridge. In a preferred embodiment the integrated circuit semiconductor sensor chip ASIC die include a Hall Effect element, preferably a plurality of oriented Hall Effect elements, preferably silicon semiconductor Hall effect elements which detect the magnetic target magnetic field.

The controllable brake preferably includes a housing including a first chamber and a second chamber. The controllable brake preferably includes a shaft, the shaft extending through the first chamber and the second chamber with an axis of rotation, the shaft having a first shaft end. The controllable brake preferably includes a controllable brake rotor made integral with the shaft, the rotor housed in the first chamber, with the rotor having a rotation plane preferably normal to the axis of rotation. The controllable brake preferably includes a controllable brake magnetic field generator located in the first chamber proximate the controllable brake rotor, the controllable brake magnetic field generator for generating a controllable magnetic field strength. The controllable brake preferably includes a controllable brake rotating magnetic target integrated with the shaft proximate the first shaft end, the controllable brake rotating magnetic target housed in the second chamber. The controllable brake preferably includes a controllable brake electronics circuit board mounted in the second chamber, the controllable brake electronics circuit board having a control board plane, the control board plane oriented normal to the shaft axis of rotation. The controllable brake preferably includes a first electronic noncontacting magnetic sensor having a first sensor plane, the first electronic noncontacting magnetic sensor integrated on the controllable brake electronics circuit board with the first sensor plane parallel with the control board plane. The controllable brake preferably includes a second electronic noncontacting magnetic sensor having a second sensor plane, the second electronic noncontacting magnetic sensor integrated on the controllable brake electronics circuit board with the second sensor plane parallel with the control board plane with the control board plane between the first sensor plane and the second sensor plane, the first electronic noncontacting magnetic sensor and the second electronic noncontacting magnetic sensor monitoring the rotation of the controllable brake rotating magnetic target and outputting a rotational position of the controllable brake rotating magnetic target wherein the controllable magnetic field strength generated by the controllable brake magnetic field generator is determined by the rotational position to control a relative motion of the controllable brake rotor.

In preferred embodiments the electronic noncontacting magnetic sensors preferably comprise integrated circuit semiconductor sensor chips with at least two positional outputs. Preferably the electronic noncontacting magnetic sensor integrated circuit semiconductor sensor chip has at least two dies. Preferably the at least two dies are ASICs (Application Specific Integrated Circuits). In a preferred embodiment the at least two dies are side by side dies in the integrated circuit semiconductor sensor chip. In a preferred embodiment the at least two dies are vertically stacked dies in the integrated circuit semiconductor sensor chip. In a preferred embodiment the integrated circuit semiconductor sensor chip ASIC die include a magnetoresistive material, preferably with electrical resistance changes in the presence of the magnetic target magnetic field, preferably with magnetoresistive elements arranged in a Wheatstone bridge. In a preferred embodiment the integrated circuit semiconductor sensor chip ASIC die include a Hall Effect element, preferably a plurality of oriented Hall Effect elements, preferably silicon semiconductor Hall effect elements which detect the magnetic target magnetic field.

The controllable brake 500 preferably includes a housing 502. The housing 502 preferably includes a first sealed chamber 504 and a second sealed chamber 506. The controllable brake preferably includes a shaft 512 with an axis of rotation 516 and a first shaft end 514. Preferably the shaft extends through the first sealed chamber and the second sealed chamber. The controllable brake 500 preferably includes a controllable brake rotor 508 made integral with the shaft, with the rotor 508 housed in the first sealed chamber 504, with the rotor 508 having a rotation plane 570 preferably normal to the axis of rotation 516. The controllable brake 500 preferably includes a controllable brake magnetic field generator 510 located in the first chamber proximate the controllable brake rotor 508, the controllable brake magnetic field generator for generating a controllable magnetic field strength. The controllable brake preferably includes a controllable brake rotating magnetic target 518 made integral with the shaft proximate the first shaft end 514 with the controllable brake rotating magnetic target 518 housed in the second sealed chamber, and a controllable brake electronics circuit board 520 mounted in the second sealed chamber. Preferably the brake operation electronics control board 520 controls and/or monitors the operation of the controllable brake 500. The controllable brake electronics circuit board 520 having a control board plane 522, the control board plane 522 oriented normal to the axis of rotation 516, a first electronic noncontacting magnetic sensor 524 having a first sensor plane 526, the first electronic noncontacting magnetic sensor 524 integrated on the controllable brake electronics circuit board 520 with the first sensor plane 526 parallel with the control board plane 522, and a second electronic noncontacting magnetic sensor 528 having a second sensor plane 530, the second electronic noncontacting magnetic sensor 528 integrated on the controllable brake electronics circuit board 520 with the second sensor plane 530 parallel with the control board plane 522 with the control board plane 522 between the first sensor plane 526 and the second sensor plane 530, the first electronic noncontacting magnetic sensor 524 and the second electronic noncontacting magnetic sensor 528 monitoring the rotation of the controllable brake rotating magnetic target 518 and outputting a rotational position of the controllable brake rotating magnetic target wherein the controllable magnetic field strength generated by the controllable brake magnetic field generator 510 is determined by the rotational position to control a relative motion of the controllable brake rotor 508. The controllable brake preferably includes a field responsive controllable material 532 sealed in the first chamber 504, preferably with the rheology of the field responsive controllable material being affected by the magnetic field generator 510. Preferably the electronic noncontacting magnetic sensors 524, 528 monitor the rotation of the rotating magnetic target 518, preferably with the magnetic sensors 524, 528 oriented and mounted relative to the shaft end 514 and its axis of rotation 516. Preferably the electronic noncontacting magnetic sensors 524, 528 are substantially planar sensors, with their sensor plane normal to axis of rotation 516, with the axis 516 centrally intersecting the sensing centers of the sensors 524, 528 with the sensor's sensing centers aligned with the axis 516. Preferably the magnetic target 518 is at the end of the shaft, preferably with the magnetic target 518 comprised of a magnet with north and south poles oriented relative and normal to the shaft axis of rotation 516 with the opposed N and S poles separated by the axis of rotation 516. Preferably the field responsive controllable material 532 is comprised of magnetic metal ferrous particles and lubricant, preferably dry ferrous particles and dry lubricant (preferably dry molybdenum disulfide). Preferably the controllable brake rotating magnetic target 518 is a permanent magnet with a north pole (N) and a south pole (S) opposed along a north south axis 534, with the north south axis 534 perpendicular with the shaft axis of rotation 516. Preferably the controllable brake 500 includes field responsive controllable material 532 sealed in the first chamber 504, with the field responsive controllable material 532 being affected by the controllable magnetic field strength, and the magnetic field generator 510 is adapted to generate a magnetic flux in a direction through the field responsive controllable material 532 towards the rotor 508, and the controllable brake electronics circuit board 520 provides a controlled current to the magnetic field generator 510. Preferably the controllable brake 500 includes a field responsive controllable material 532 sealed in the first chamber 504 with a rheology of the field responsive controllable material 532 being affected by the controllable magnetic field strength, and the magnetic field generator 510 is adapted to generate a magnetic flux 536 in a direction through the field responsive controllable material 532 towards the rotor 508, and the controllable brake electronics circuit board 520 provides a controlled current 538 to the magnetic field generator 510. Preferably the controllable brake shaft 512 is supported for rotation about axis 516 by bearings 540 in the housing 502, and further including seals 542 for sealing the first chamber to retain the controllable material 532 therein, preferably with the first and second chambers sealed from each other with the seals 542 and the housing members to provide the first and second separate sealed chambers 504,506, preferably with the field generator 510, including a pole piece member 544 which provides for both the generation of a magnetic field with an electromagnetic coil 546 and a housing divider for separating the housing 502 into the first and second chambers. Preferably the magnetic field generator 510 includes an electromagnetic coil 546 and the controllable brake electronics circuit board 520 is electrically connected with the magnetic field generator electromagnetic coil 546, preferably with electrical contact connections leads 548 to the EM coil 546. Preferably the electronics circuit board 520 provides a current 538 (i) to EM coil 546, for applying magnetic field flux 536 whose strength is determined by the rotational position of the rotor 508, with the magnetic target 518 rotation angle sensed by the sensors 524, 528. In a preferred embodiment at least one of the electronic noncontacting magnetic sensors 524,528 include a magnetoresistive material, preferably with electrical resistance changes in the presence of the magnetic target 518 magnetic field, preferably with magnetoresistive elements arranged in a Wheatstone bridge. In a preferred embodiment at least one of the electronic noncontacting magnetic sensors 524,528 includes a Hall Effect element, preferably a plurality of oriented Hall Effect elements, preferably silicon semiconductor Hall effect elements.

In a preferred embodiment the electronic noncontacting magnetic sensor includes a magnetoresistive material, preferably with electrical resistance changes in presence of a sensed magnetic field, preferably with magnetoresistive elements arranged in a Wheatstone bridge integrated circuit sensor chip with a planar format providing a sensor plane. In a preferred embodiment the electronic noncontacting magnetic sensor includes a Hall Effect element, preferably a plurality of oriented Hall Effect elements, preferably silicon semiconductor Hall effect elements arranged in an integrated circuit sensor chip with a planar format providing a sensor plane.

In an embodiment the invention includes a controllable brake. The controllable brake preferably includes a rotating magnetic target. The controllable brake preferably includes a magnetically permeable rotor. The controllable brake preferably includes a shaft connected to the magnetically permeable rotor. The controllable brake preferably includes a housing having a first housing chamber rotatably housing the magnetically permeable rotor therein, and including a magnetic field generator spaced from the magnetically permeable rotor, and configured and positioned for generating a controllable magnetic field to control a relative motion of the magnetically permeable rotor, and a second housing chamber containing control electronics therein, the second housing chamber electronics including at least a first oriented electronic noncontacting magnetic sensor, the at least first oriented electronic noncontacting magnetic sensor oriented relative to the rotating magnetic target and the shaft wherein the at least first oriented electronic noncontacting magnetic sensor monitors the rotation of the rotating magnetic target.

Preferably the controllable brake 500 includes rotating magnetic target 518. The controllable brake 500 preferably includes magnetically permeable rotor 508. The controllable brake preferably includes shaft 512 connected to the magnetically permeable rotor 508. The controllable brake preferably includes housing 502 having a first housing chamber 504 rotatably housing the magnetically permeable rotor 508 therein, and including a magnetic field generator 510 spaced from the magnetically permeable rotor 508, and configured and positioned for generating a controllable magnetic field 536 to control a relative motion of the magnetically permeable rotor 508, and a second housing chamber 506 containing control electronics 520 therein, the second housing chamber electronics 520 including at least a first oriented electronic noncontacting magnetic sensor 524, the at least first oriented electronic noncontacting magnetic sensor oriented relative to the rotating magnetic target 518 and the shaft 512 wherein the at least first oriented electronic noncontacting magnetic sensor monitors the rotation of the rotating magnetic target 518. Preferably the brake includes a controllable material 532, preferably contained in the first chamber 504 between and preferably filling the space between the magnetically permeable rotor 508 and the magnetic field generator 510 with the magnetic field generator spaced from the magnetically permeable rotor with the controllable material in-between the two with the two configured and positioned for generating a controllable magnetic field 536 to control the relative motion of the magnetically permeable rotor 508 relative to the magnetic field generator 510 with the magnetic field flux 536 through the controllable material 532 sealed in the first chamber between the magnetically permeable rotor and magnetic field generator controlling the relative motion. Preferably the at least first electronic noncontacting magnetic sensor provides a detected measured rotational position of the rotor, and the circuit board 520 control electronics are electrically connected with the magnetic field generator 510 and provide electrical control of the magnetic field generator 510 to apply a magnetic field 536 whose strength is determined by the detected measured rotational position of the rotor. Preferably the circuit board 520 control electronics electrical contact connections leads 548 deliver a current 538 to the EM coil 546, preferably with the electronics circuit board providing current i to EM coil 546 for applying magnetic field 536 whose strength is determined by the relative rotational position of the rotor 508 as the magnetic target rotation angle sensed by the at least one noncontact oriented senor. Preferably the at least first oriented electronic noncontacting magnetic sensor is integrated into brake operation electronics control board 520 mounted in the second sealed chamber 506 wherein the brake operation electronics control board 520 controls the operation of the controllable brake 500. Preferably the noncontacting magnetic sensor has a sensor plane 526, 530 oriented with the shaft axis of rotation 516, preferably with the sensor plane parallel with control board plane 522 with such normal to shaft axis of rotation 516, with the rotation axis 516 intersecting the sensor plane proximate the sensing center of the noncontacting magnetic sensor. Preferably the controllable brake 500 includes a second oriented electronic noncontacting magnetic sensor 528, wherein the first electronic noncontacting magnetic sensor 524 and the second electronic noncontacting magnetic sensor 528 are integrated into brake operation electronics control board 520 mounted in the second sealed chamber 506 wherein the brake operation electronics control board 520 controls and/or monitors the operation of the controllable brake 500. Preferably the at least first and second magnetic sensors 524, 528 have a sensor planes oriented with the shaft axis of rotation 516, preferably with the sensor planes parallel with control board plane 522, with such planes normal to shaft axis of rotation, with the control board plane 522 between the first and second sensor planes 526 and 530. Preferably the brake operation electronics control circuit board 520 has a less than one millimeter thickness between the first oriented electronic noncontacting magnetic sensor 524 and the second oriented electronic noncontacting magnetic sensor 528, and the rotating magnetic target 518 is comprised a shaft oriented permanent magnet, preferably with permanent magnet N-S pole axis 534. Preferably the magnetic sensors have sensor planes oriented with the shaft axis of rotation 516, preferably with the sensor planes parallel with the control board plane, with such normal to the shaft axis of rotation, with the control board plane of the less than one millimeter thickness circuit board between the first and second sensor planes.

In an embodiment the invention includes a method of controlling motion. The method preferably includes providing a housing having a first housing chamber and a second housing chamber. The method preferably includes providing a shaft with a magnetically permeable rotor, the shaft including a rotating magnetic target distal from the magnetically permeable rotor. The method preferably includes providing a magnetic field generator for generating a magnetic field with a controllable field strength for controlling a relative motion of the magnetically permeable rotor. The method preferably includes providing at least a first electronic noncontacting magnetic sensor, the at least first electronic noncontacting magnetic sensor integrated on an operation electronic control board having a control board plane. The method preferably includes disposing the magnetically permeable rotor and the magnetic field generator in the first housing chamber. The method preferably includes disposing the rotating magnetic target and the at least a first electronic noncontacting magnetic sensor in the second housing chamber, wherein the operation electronic control board is in electrical communication with the magnetic field generator and the control board plane is oriented relative to the rotating magnetic target, wherein the at least first electronic noncontacting magnetic sensor provides a detected measured rotational position of the rotating magnetic target with the controllable field strength generated in relationship to the detected measured rotational position sensed by the at least first electronic noncontacting magnetic sensor.

Preferably the controlling motion method includes providing a housing 502 having a first housing chamber 504 and a second housing chamber 506. Preferably the controlling motion method includes providing a shaft 512 with a magnetically permeable rotor 508, with the shaft including a rotating magnetic target 518 distal from the magnetically permeable rotor 508. Preferably the controlling motion method includes providing a magnetic field generator 510 for generating a magnetic field with a controllable field strength for controlling a relative motion of the magnetically permeable rotor. Preferably the controlling motion method includes providing a field responsive controllable material, with the field responsive controllable material affected by the magnetic field generator magnetic field. Preferably the provided field responsive controllable material has a rheology which is controllable by the generated magnetic field, preferably with a field responsive controllable material 532 provided from magnetic metal ferrous particles and lubricant, preferably dry ferrous particles and dry lubricant (preferably dry molybdenum disulfide lubricant). Preferably the controlling motion method includes providing at least a first electronic noncontacting magnetic sensor 524, 528. Preferably the at least first electronic noncontacting magnetic sensor is integrated on an operation electronic control board 520 having a control board plane 522. Preferably the controlling motion method includes disposing the magnetically permeable rotor, the magnetic field generator, in the first housing chamber. Preferably disposing the magnetically permeable rotor, the magnetic field generator, in the first housing chamber includes sealing such therein along with the field responsive controllable material 532. Preferably the controlling motion method includes disposing the rotating magnetic target 518 and the at least a first electronic noncontacting magnetic sensor in the second housing chamber 506, wherein the operation electronic control board 520 is in electrical communication with the magnetic field generator 510 and the control board plane 522 is oriented relative to the rotating magnetic target 518, wherein the at least first electronic noncontacting magnetic sensor provides a detected measured rotational position of the rotating magnetic target with the controllable field strength generated in relationship to the detected measured rotational position sensed by the at least first electronic noncontacting magnetic sensor. Preferably the at least first electronic noncontacting magnetic sensor has the sensor plane (526, 530) oriented with the control board plane 522. Preferably the sensor plane (526, 530) is parallel with control board plane 522, with such normal to shaft axis of rotation 516, with rotation axis 516 intersecting the sensor plane proximate the sensing center of the sensor. Preferably the method includes providing a second electronic noncontacting magnetic sensor with a sensor plane (526, 530) with the second electronic noncontacting magnetic sensor integrated on the operation electronic control board with the second electronic noncontacting magnetic sensor plane oriented parallel with the control board plane, with the control board plane between the second electronic noncontacting magnetic sensor plane and the first electronic noncontacting magnetic sensor plane. In an embodiment preferably at least one of the electronic noncontacting magnetic sensor includes a magnetoresistive material, preferably with electrical resistance changes in presence of the target magnetic field, preferably with magnetoresistive elements arranged in a Wheatstone bridge. In an embodiment preferably at least one of the electronic noncontacting magnetic sensor includes a Hall Effect element, preferably a plurality of oriented Hall Effect elements, preferably silicon semiconductor Hall effect elements for sensing shaft rotational changes of the target magnetic field.

In an embodiment the invention includes a method of making a motion control brake for controlling motion. The method preferably includes providing a magnetic field generator for generating a magnetic field with a controllable field strength for controlling a relative motion of a movable brake member. The method preferably includes providing a magnetic target which moves with the relative motion of the movable brake member. The method preferably includes providing an electronic circuit board having a circuit board plane, a first oriented electronic noncontacting magnetic sensor having a first oriented sensor plane, the first electronic noncontacting magnetic sensor integrated on the electronic circuit board with the first sensor plane parallel with the circuit board plane, a second oriented electronic noncontacting magnetic sensor having a second oriented sensor plane, the second electronic noncontacting magnetic sensor integrated on the electronic circuit board with the second sensor plane parallel with the circuit board plane with the circuit board plane between the second sensor plane and the first sensor plane. The method preferably includes disposing the electronic circuit board proximate the magnetic target wherein the first electronic noncontacting magnetic sensor and the second electronic noncontacting magnetic sensor provide a detected measured magnetic target position with the controllable field strength generated by the magnetic field generator determined by the detected measured magnetic target position.

Preferably the method of making a motion control brake 500 includes providing a magnetic field generator 510 for generating a magnetic field 536 with a controllable field strength for controlling a relative motion of a movable brake member 508. The method preferably includes providing a magnetic target 518 which moves with the relative motion of the movable brake member 508. The method preferably includes providing an electronic circuit board 520 having a circuit board plane 522, a first oriented electronic noncontacting magnetic sensor 524 having a first oriented sensor plane 526, the first electronic noncontacting magnetic sensor 524 integrated on the electronic circuit board 520 with the first sensor plane 526 parallel with the circuit board plane 522, a second oriented electronic noncontacting magnetic sensor 528 having a second oriented sensor plane 530, the second electronic noncontacting magnetic sensor 528 integrated on the electronic circuit board 520 with the second sensor plane 530 parallel with the circuit board plane 522 with the circuit board plane 522 between the second sensor plane 530 and the first sensor plane 526. The method preferably includes disposing the electronic circuit board 520 proximate the magnetic target 518 wherein the first electronic noncontacting magnetic sensor 524 and the second electronic noncontacting magnetic sensor 528 provide a detected measured magnetic target position with the controllable field strength generated by the magnetic field generator 510 determined by the detected measured magnetic target position. Preferably the movable brake member is comprised of a movable brake rotor 508, preferably with a shaft 512 having a distal end permanent magnet magnetic target 518 which moves with the relative motion of the movable brake rotor. Preferably the electronic circuit board first integrated oriented electronic noncontacting magnetic sensor 524 and its first oriented sensor plane parallel with the circuit board plane and the second integrated oriented electronic noncontacting magnetic sensor 528 with its second oriented sensor plane parallel with the circuit board plane with the circuit board plane between the second sensor plane and the first sensor plane, with the method including the integrating and orienting the two sensors overlappingly on both planar sides of the circuit board 520. Preferably the overlapping integrated and oriented sensors and in between circuit board are disposed proximate the magnetic target 518 wherein the first electronic noncontacting magnetic sensor 524 and the second electronic noncontacting magnetic sensor 528 provide a detected measured magnetic target position with the controllable field strength generated by the magnetic field generator 510 determined by the detected measured magnetic target position. The method preferably includes providing a shaft 512 with the movable brake member comprising rotor 508 and the magnetic target 518 includes a permanent magnet with a north pole and a south pole opposed along a north south axis 534, preferably with the north south axis 534 perpendicular with the shaft axis of rotation 516, preferably with the movable brake member rotor 508 made integral with the shaft 512 and the magnetic target permanent magnet 518 made integral with the shaft. Preferably the integrating the shaft and rotor includes connecting the rotor with the shaft in a manner to restrain relative rotation there between. Preferably the shaft, the movable brake member rotor, and the magnetic target permanent magnet have an axis of rotation 516 with the circuit board plane 522 oriented normal to the axis of rotation 516 with the axis of rotation going through the sensor centers, preferably with the north south axis 534 perpendicular with the shaft axis of rotation 516. Preferably the electronic circuit board 520 has a less than one millimeter thickness between the first oriented electronic noncontacting magnetic sensor 524 and the second oriented electronic noncontacting magnetic sensor 528, and preferably the rotating magnetic target 518 is comprised of a shaft oriented permanent magnet. Preferably the first electronic noncontacting magnetic sensor 524 and the second electronic noncontacting magnetic sensor 528 provide the circuit board with at least a first position output, at least a second position output, and at least a third position output, and most preferably four simultaneously detected position outputs, with the motion control brake method/system including a position output processor for processing the multiply position outputs, preferably with the position output processor comparing the multiply outputs to determine if there is a suspected error output and exclude such suspected error output from the determination of the magnetic field generated to actively control motion with the brake. Preferably the controllable brake provides a multiply redundancy controllable brake sensor system with the brake sensors at least three simultaneously sensed positions outputs monitored and compared for suspected error output, with error outputs excluded from the electronic control system determination of controlling the applied magnetic field to control the relative motion allowed by the brake, either within an inner control loop operating within the brake or an outer control loop within which the brake is integrated to provide the brake's control of motion and outputted target sensed positions. In an embodiment the electronic noncontacting magnetic sensors include magnetoresistive materials with electrical resistance changes in the presence of the magnetic target magnetic field, preferably with sensor magnetoresistive elements arranged in a Wheatstone bridge to sense the rotating magnetic field of the magnetic targets pole axis 534. In an embodiment the electronic noncontacting magnetic sensors include a Hall Effect element, preferably a plurality of oriented Hall Effect elements, preferably silicon semiconductor Hall effect elements integrated together to sense the rotating magnetic field of the magnetic targets pole axis 534.

In an embodiment the invention includes a method of making a control system. The method preferably includes providing a control system rotating magnetic target having an axis of rotation. The method preferably includes providing a control system electronic circuit board having a circuit board plane and a first circuit board side and an opposite second circuit board side, a first oriented electronic noncontacting magnetic sensor integrated on the electronic circuit board first circuit board side, a second oriented electronic noncontacting magnetic sensor integrated on the electronic circuit board second circuit board side. The method preferably includes disposing the control system electronic circuit board proximate the control system rotating magnetic target with a projected extension of the axis of rotation extending through the first oriented electronic noncontacting magnetic sensor and the second oriented electronic noncontacting magnetic sensor wherein the first electronic noncontacting magnetic sensor and the second electronic noncontacting magnetic sensor provide a plurality of detected measured magnetic target rotary position outputs.

Preferably the method of making a control system includes providing a control system rotating magnetic target 518 having an axis of rotation 516. The method preferably includes providing a control system electronic circuit board 520 having a circuit board plane 522 and a first circuit board side 521' and an opposite second circuit board side 521", a first oriented electronic noncontacting magnetic sensor 524 integrated on the electronic circuit board first circuit board side 521', a second oriented electronic noncontacting magnetic sensor 528 integrated on the electronic circuit board second circuit board side 521". The method preferably includes disposing the control system electronic circuit board 520 proximate the control system rotating magnetic target 518 with a projected extension of the axis of rotation 516 extending through the first oriented electronic noncontacting magnetic sensor 524 and the second oriented electronic noncontacting magnetic sensor 528 wherein the first electronic noncontacting magnetic sensor 524 and the second electronic noncontacting magnetic sensor 528 provide a plurality of detected measured magnetic target rotary position outputs. Preferably the method includes integrating and orienting the two sensors overlappingly on both planar sides of the circuit board 520. Preferably overlapping, integrating and orienting the sensors on the circuit board such that the circuit board is mountable proximate the magnetic target 518 wherein the first electronic noncontacting magnetic sensor 524 and the second electronic noncontacting magnetic sensor 528 provide a plurality of simultaneously detected measured magnetic target position outputs. Preferably the magnetic target 518 includes a permanent magnet with a north pole and a south pole opposed along a north south axis 534 with the north south axis perpendicular with the axis of rotation 516, preferably with the overlapping, integrated oriented sensors 524, 528, preferably providing at least a first position output, at least a second position output, and at least a third position output, and most preferably four simultaneously detected position outputs, with the motion control system including a position output processor for processing the multiply position outputs, preferably with the position output processor comparing the multiply outputs to determine if there is a suspected error output and exclude such suspected error output from the control system process loop. Preferably the control system provides a multiply redundancy control sensor system with the sensors at least three simultaneously sensed positions outputs monitored and compared for suspected error output, with error outputs excluded from the electronic control system determination control loops (either within an inner control loop operating within the control system electronic circuit board 520 or an outer control loop within which the board is integrated into to provide the outputted target sensed positions). In an embodiment the electronic noncontacting magnetic sensors include magnetoresistive materials with electrical resistance changes in the presence of the magnetic target magnetic field, preferably with sensor magnetoresistive elements arranged in a Wheatstone bridge to sense the rotating magnetic field of the magnetic targets pole axis 534. In an embodiment the electronic noncontacting magnetic sensors include a Hall Effect element, preferably a plurality of oriented Hall Effect elements, preferably silicon semiconductor Hall effect elements integrated together to sense the rotating magnetic field of the magnetic targets pole axis 534. Preferably the electronic circuit board 520 has a less than one millimeter thickness between the first oriented electronic noncontacting magnetic sensor and the second oriented electronic noncontacting magnetic sensor, and preferably the rotating magnetic target includes a shaft oriented permanent magnet.

Preferably the first electronic noncontacting magnetic sensor and the second electronic noncontacting magnetic sensor provide the circuit board 520 with at least a first position output, at least a second position output, and at least a third position output, and preferably four simultaneously detected position outputs, with the motion control system including a position output processor for processing the multiply position outputs, which preferably compares the multiply outputs to determine if there is a suspected error output and exclude such suspected error output from the determination in a control system control loop step.

In an embodiment the invention includes a method of controlling motion. The method preferably includes providing a magnetic field generator for generating a magnetic field with a controllable field strength. The method preferably includes providing a field responsive controllable material, the field responsive controllable material affected by the magnetic field generator magnetic field. The method preferably includes providing a magnetic target. The method preferably includes providing at least a first electronic noncontacting magnetic sensor, the at least first electronic noncontacting magnetic sensor integrated on an operation electronic control board having a control board plane, the operation electronic control board in electrical communication with the magnetic field generator and the control board plane oriented relative to the magnetic target, wherein the at least a first electronic noncontacting magnetic sensor provides a detected measured position of the magnetic target with the controllable field strength generated in relationship to the detected measured position sensed by the at least first electronic noncontacting magnetic sensor.

Preferably the method of controlling motion includes providing a magnetic field generator 510 for generating a magnetic field 536 with a controllable field strength. The method preferably includes providing a field responsive controllable material 532, the field responsive controllable material affected by the magnetic field generator magnetic field. The method preferably includes providing a magnetic target 518. The method preferably includes providing at least a first electronic noncontacting magnetic sensor 524, the at least first electronic noncontacting magnetic sensor 524 integrated on an operation electronic control board 520 having a control board plane 522, the operation electronic control board 520 in electrical communication with the magnetic field generator 510 and the control board plane 522 oriented relative to the magnetic target 518, wherein the at least a first electronic noncontacting magnetic sensor 524 provides a detected measured position of the magnetic target 518 with the controllable field strength 536 generated in relationship to the detected measured position sensed by the at least first electronic noncontacting magnetic sensor 524. Preferably providing a field responsive controllable material 532 includes providing a material rheology which is field responsive, with the field responsive controllable material rheology affected and controllable by the magnetic field generator magnetic field 536, preferably the provided field responsive controllable material 532 is comprised of magnetic metal ferrous particles and lubricant, preferably dry ferrous particles and dry lubricant (preferably dry molybdenum disulfide). Preferably the provided magnetic target is a rotating magnetic target, that preferably provides a rotating magnetic field with the permanent magnet pole axis 534. Preferably the at least first electronic noncontacting magnetic sensors provide a detected measured rotational position of the magnetic target with the controllable magnetic field strength generated in relationship to the detected measured rotational position sensed by the at least first electronic noncontacting magnetic sensor. Preferably the at least first electronic noncontacting magnetic sensor 524 has a sensor plane 526 oriented with the control board plane 522. Preferably the at least first electronic noncontacting magnetic sensor plane 526 is oriented normal with the shaft axis of rotation 516. Preferably the sensor plane 526 is parallel with control board plane 522, with such normal to shaft axis of rotation 516, with the axis 516 intersecting sensor plane proximate the sensing center of the sensor 524. Preferably the method includes providing second electronic noncontacting magnetic sensor 528 with a sensor plane 530, with the second electronic noncontacting magnetic sensor 528 integrated on the operation electronic control board 520 with the second electronic noncontacting magnetic sensor plane 530 oriented parallel with the control board plane 522, with the control board plane 522 between the second electronic noncontacting magnetic sensor plane 530 and the first electronic noncontacting magnetic sensor plane 526. In an embodiment the electronic noncontacting magnetic sensors include magnetoresistive materials with electrical resistance changes in the presence of the magnetic target magnetic field, preferably with sensor magnetoresistive elements arranged in a Wheatstone bridge to sense the rotating magnetic field of the magnetic targets pole axis 534. In an embodiment the electronic noncontacting magnetic sensors include a Hall Effect element, preferably a plurality of oriented Hall Effect elements, preferably silicon semiconductor Hall effect elements integrated together to sense the rotating magnetic field of the magnetic targets pole axis 534.

Figure 3:
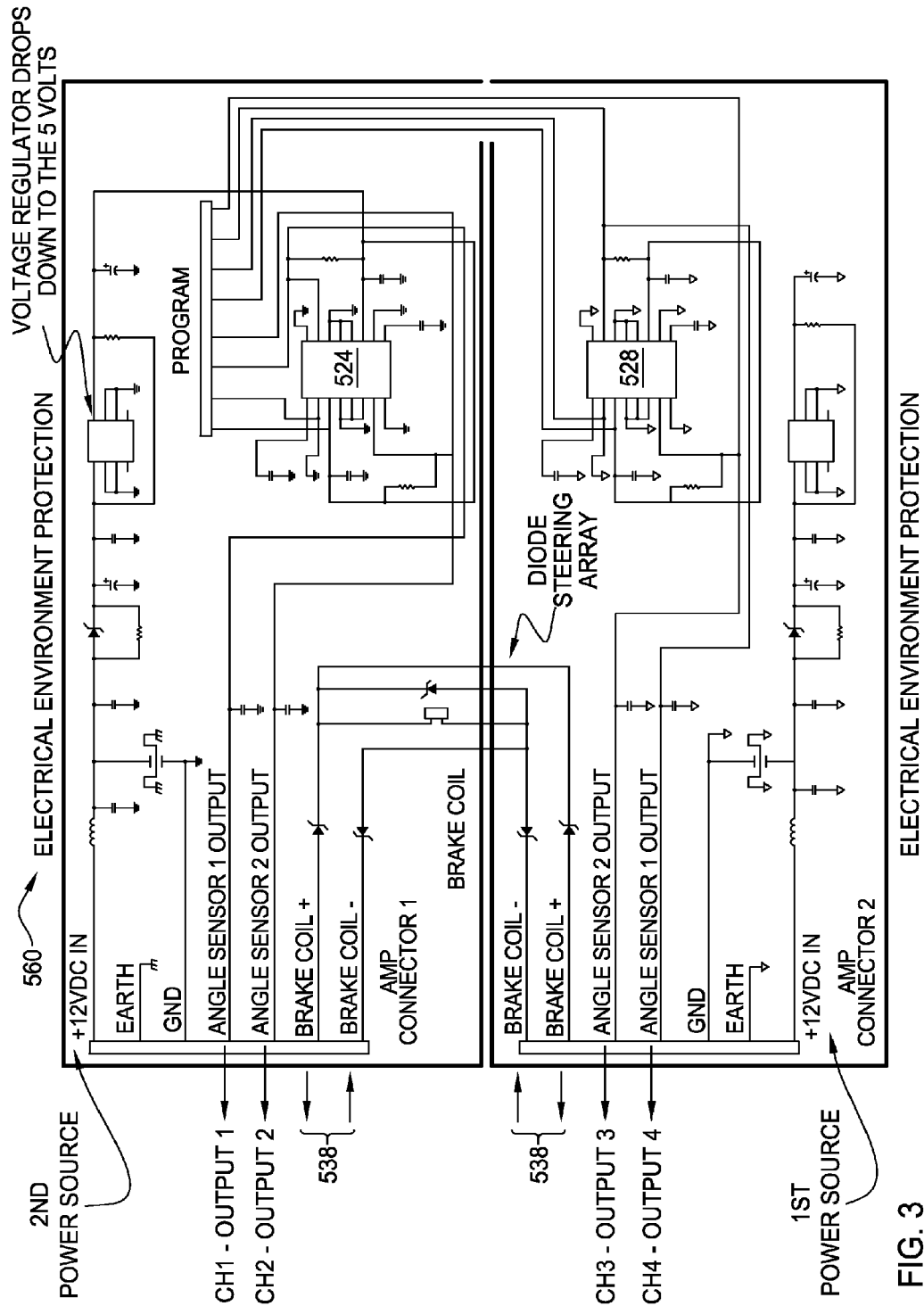
FIG. 3 shows an operator interface controllable brake system schematic.
Figure 4:
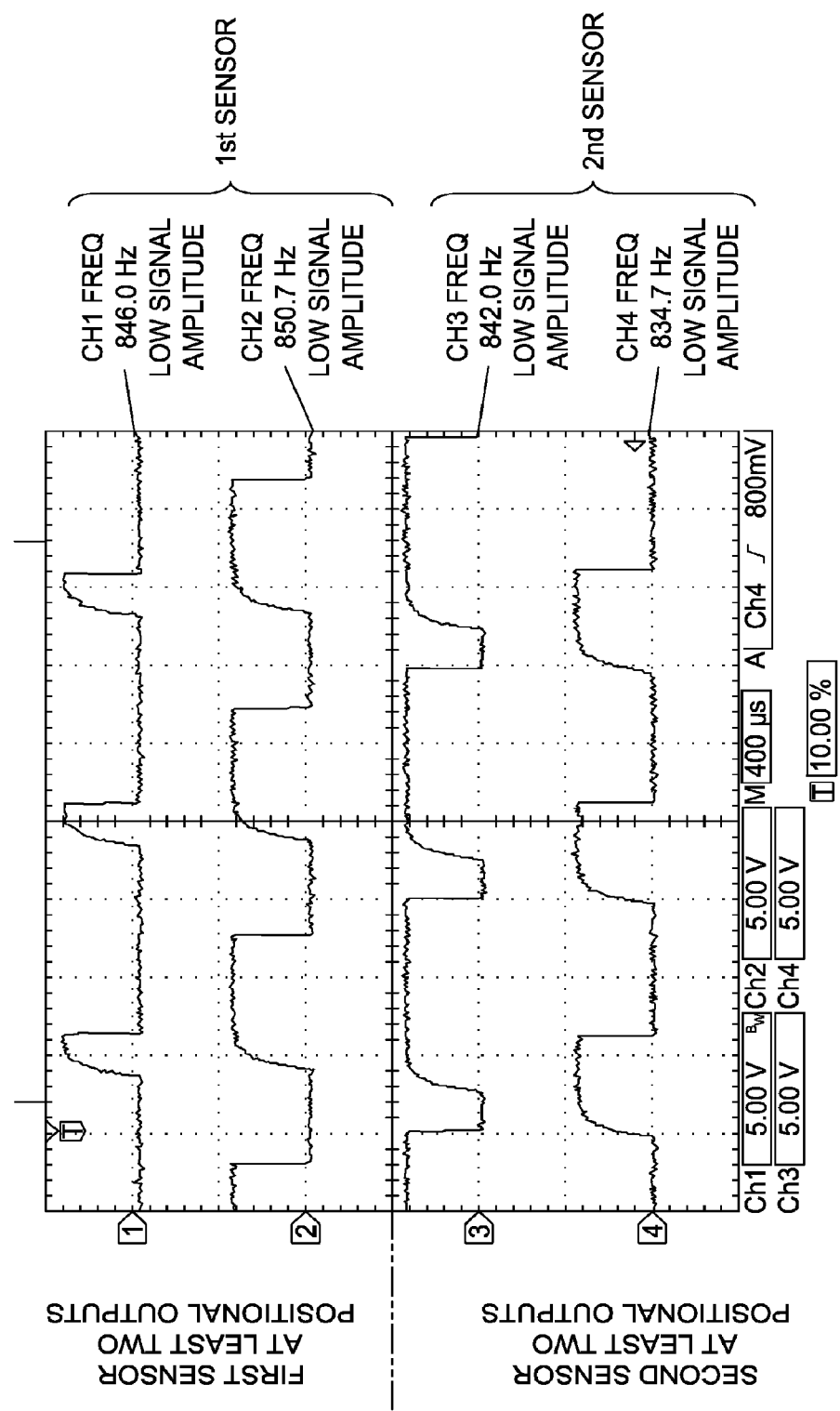
FIG. 4 shows four positional outputs for an operator interface controllable brake with two oriented electronic noncontacting magnetic sensors.
Figure 5B:
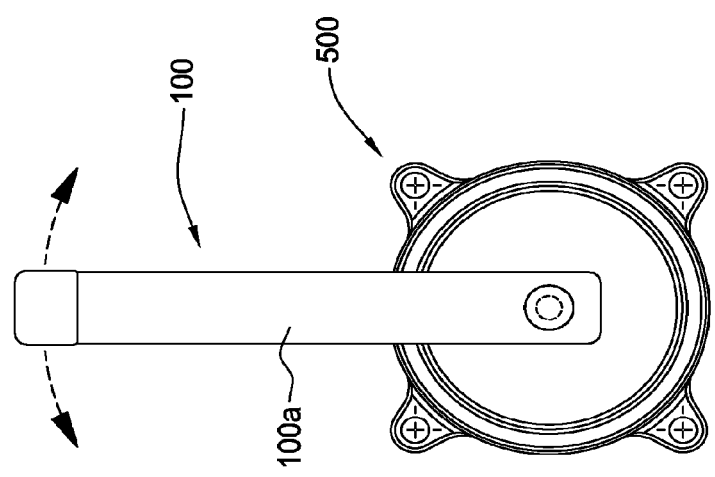
FIGS. 5A-6B illustrate a marine vehicle machine with an operator interface controllable brake device lever with multiple detent positions for controlling the operation of the vehicle.
Figure 5A:
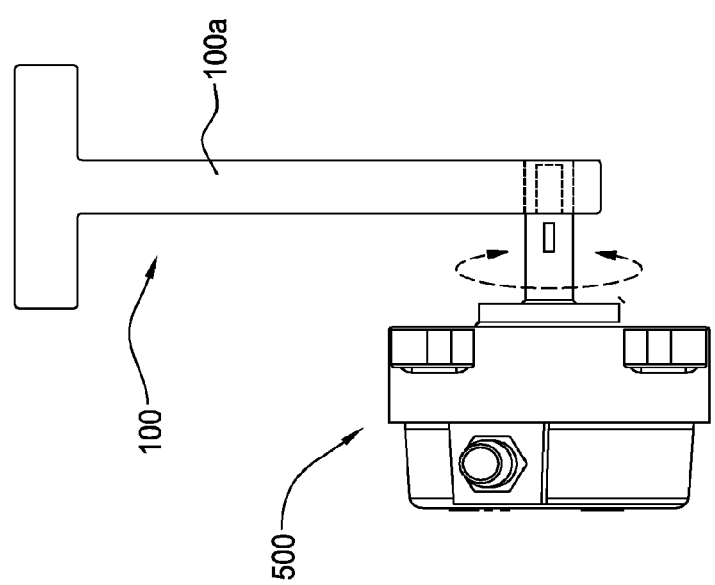
Figure 5C:
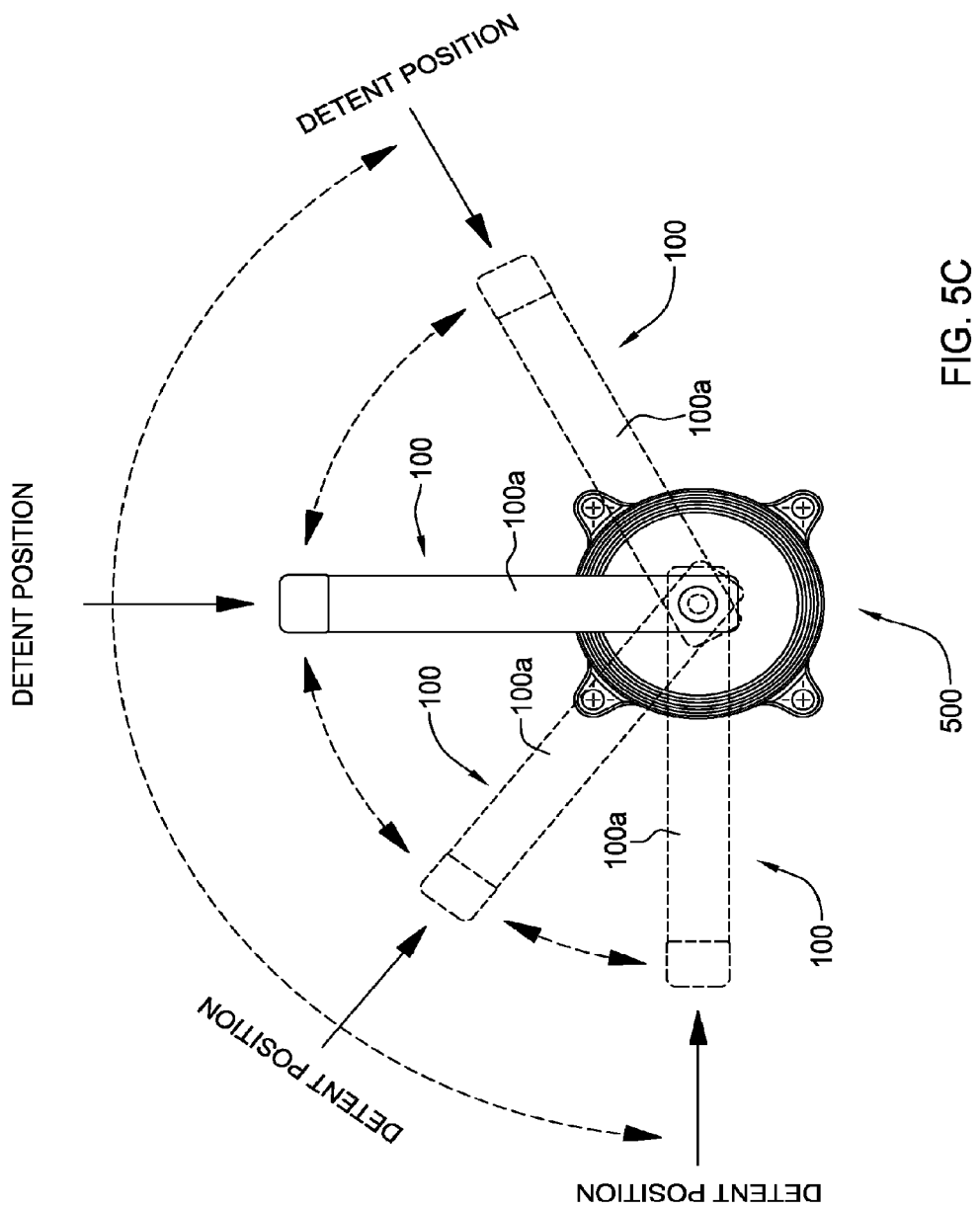
Figure 6A:
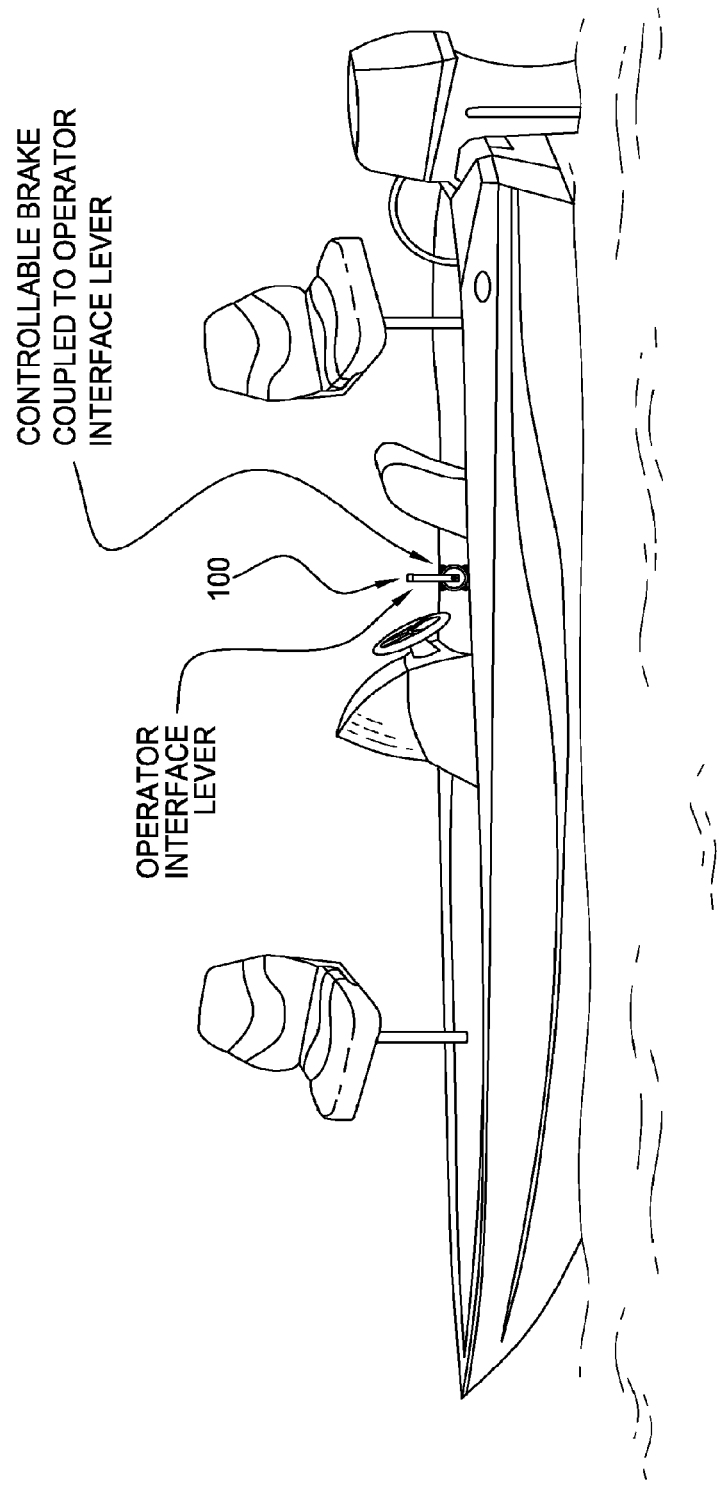
Figure 7:
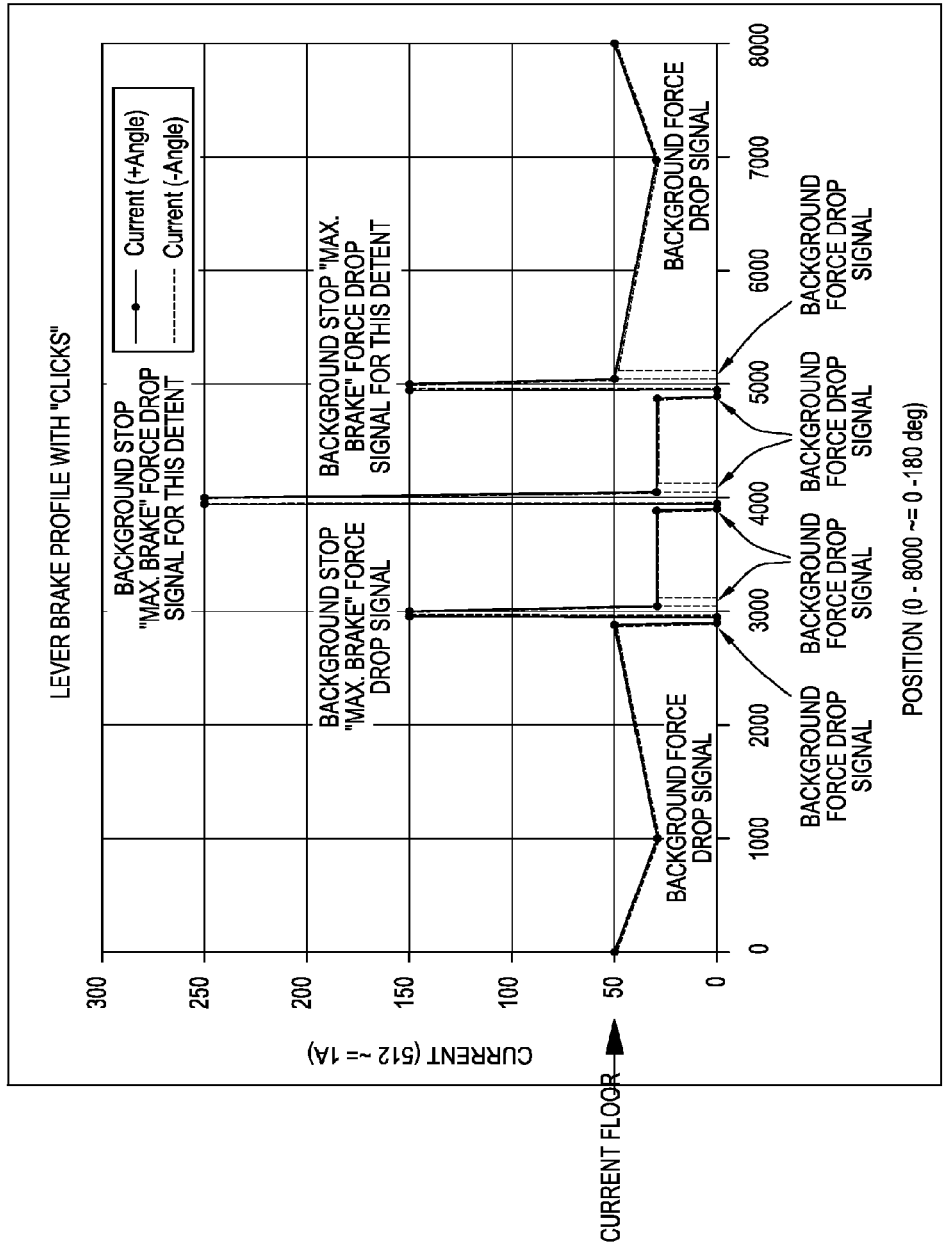
FIG. 7 shows a lever brake profile with multiple (3) detent sensation clicks with 180 degree rotation of interface lever rotating about the brake shaft axis with position plotted along the x-axis and current along the y-axis with the current floor background force between the force drop and the maximum brake force currents for the particular detent.
Figure 8:
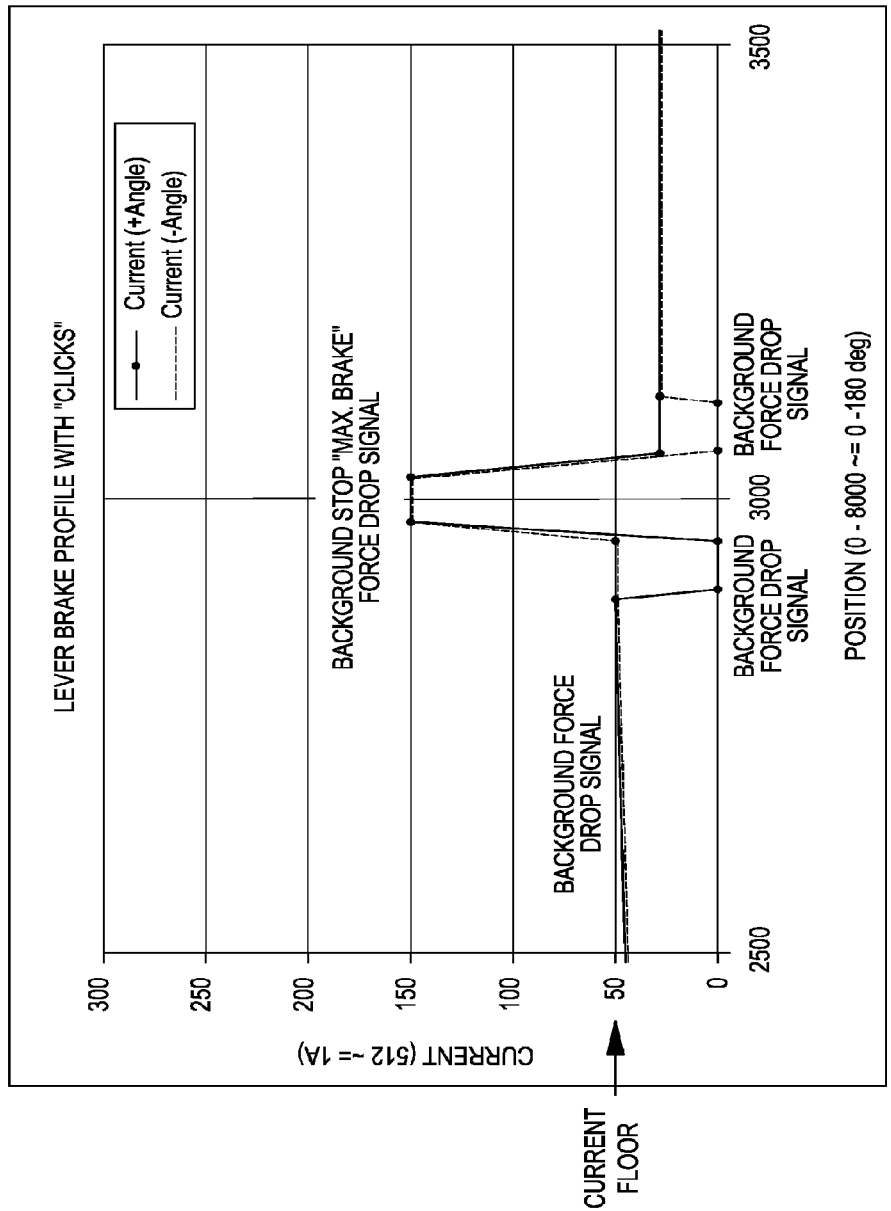
FIG. 8 shows a lever brake profile for a detent sensation click targeted interface lever position centered about position 3000 with the lever rotating about the brake shaft axis with position plotted along the x-axis and current along the y-axis with the current floor background force between the force drop and the maximum brake force current.
Figure 9:
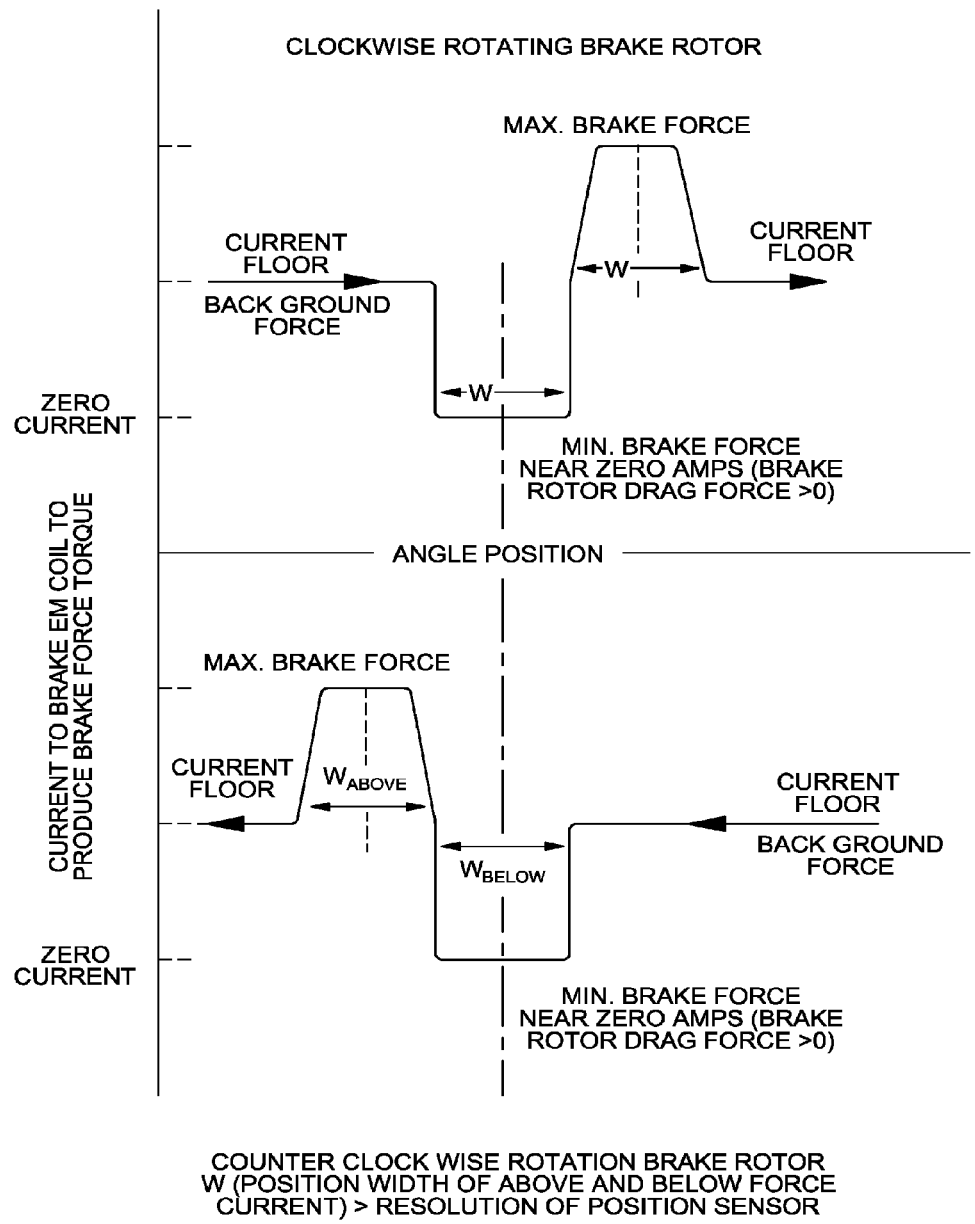
FIG. 9 shows plots of angle position (such as sensed by the position sensor) in the x-axis direction compared with current to the brake EM coil to produce brake force torque in the y-axis direction with the top half illustrating clockwise rotation of the brake rotor and the bottom half illustrating counterclock wise rotation of the brake rotor, with w (position width of above and below force current) greater than the resolution of the position sensor.

Preferably the circuit board 520 includes electrical environmental protection circuitry. Preferably the circuit board circuitry includes electrical environmental protection circuitry 560 such as shown in FIG. 3. Preferably the circuit board circuitry includes a voltage regulator which drops down a first supplied voltage to the board down to a lowered sensor voltage for the sensor, such as the LM2931 voltage regulator such as shown in FIG. 3 dropping down the 12 volt power down to the 5 volt power supplied to the sensors 524, 528. Preferably the electrical environmental protection circuitry includes an electromagnetic filter providing EMC filtering protection. Preferably the circuit board 520 includes a first and a second power source, with the circuit board controlling the supply, conditioning and distribution of electrical power from the at least two power sources, to provide a controlled current 538 to the brake coil 546. The circuit board 520 provides control, supply, conditioning and distribution of current to the sensors 524, 528 and the EM coil 546 of the field generator 510, and output sensed angular position data such as shown in FIG. 4. Additionally in an embodiment the control system includes an outer control loop with the EM coil controlled outside the inner loop utilizing the output sensed angular position data from the sensors and board control system, such as with the FIG. 4 output data used to determine and produce a control current to EM coil 546 to control a relative motion with the brake 500. Preferably the at least two power sources provide for power supply to the same sensor. In a preferred embodiment the first power supply provides power to both sensors, with a backup secondary power supplied to the sensors from the second power supply. In preferred embodiments the 12 volt power to the circuit board 520 and the outputted sensed angular position data from the sensors are provided through the electronics outer loop conduit utilizing two separate cables routing the wiring into the second chamber 506. Preferably two separate cabled power supplies are supplied to the double sided board 520, with the circuit board 520 providing two isolated power supplies to a sensor. Preferably two separate cabled power supplies are supplied to the double sided board 520, with the circuit board 520 including electronics to send power to the EM brake coil 546, preferably at least with a control current 538 provided such as with the current control flyback diode steer current from two isolated power supplies supplied to the brake EM coil 546. In a preferred embodiment the board includes a processor that determines on board with an inner loop in the brake 500 to provide the control current 538 to the EM coil 546 based on the sensed position of the magnetic target 518, preferably with a position output processor processing the multiply position outputs from the sensors, which preferably compares the multiply outputs to determine if there is a suspected error output and exclude such suspected error output from the determination in the system control loop step. Preferably one set of electrical contact connections 548 deliver the control current 538 to the EM coil from the diode steering array. As shown in FIG. 4, the integrated oriented first and second sensors provide four detected target positions, preferably providing the absolute angular position of the rotating magnetic target 518, the shaft 512, and the rotor 508, preferably with the four outputs monitored and compared to detect a suspected erroneous output which in turn is ignored and not utilized in the determination of controlling the motion of the rotor with the field generator 510. FIG. 4 shows the positional outputs from two integrated circuit semiconductor sensor chip electronic noncontacting magnetic sensors 524, 528 mounted to opposing sides of a circuit board 520 for detecting the rotation of the target 518, the shaft 512, and the rotor 508. Channels 1 and 2 (Ch1, Ch2) show the at least two positional outputs (Ch1, Ch2) for the first integrated circuit semiconductor sensor chip electronic noncontacting magnetic sensor. Channels 3 and 4 (Ch3, Ch4) show the at least two positional outputs (Ch3, Ch4) for the second integrated circuit semiconductor sensor chip electronic noncontacting magnetic sensor. In this embodiment each of the integrated circuit semiconductor sensor chip electronic noncontacting magnetic sensors provided simultaneously two positional outputs (Ch1, Ch2) and (Ch3, Ch4). Preferably the electronic noncontacting magnetic sensor integrated circuit semiconductor sensor chip has at least two dies. Preferably the at least two dies are ASICs (Application Specific Integrated Circuits). In a preferred embodiment the at least two dies are side by side dies in the integrated circuit semiconductor sensor chip. In a preferred embodiment the at least two dies are vertically stacked dies in the integrated circuit semiconductor sensor chip. In a preferred embodiment the integrated circuit semiconductor sensor chip ASIC die include a magnetoresistive material, preferably with electrical resistance changes relative to the rotating shaft magnetic target magnetic field, preferably with magnetoresistive elements arranged in a Wheatstone bridge. In a preferred embodiment the integrated circuit semiconductor sensor chip ASIC die include a Hall Effect element, preferably a plurality of oriented Hall Effect elements, preferably silicon semiconductor Hall effect elements which detect changes relative to the rotating magnetic target magnetic field of the rotating shaft magnetic target.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

What is claimed is:

1. An operator input device, said operator input device including an operator interface operable by an operator, the operator interface being moveable in at least first and second directions along an axis; a position sensor system coupled to the operator interface for transmitting an operator interface position signal as a function of the position of the operator interface; a brake controller system coupled to the position sensor system for receiving an operator interface position signal and transmitting a brake signal, and a brake coupled to the brake controller system and the operator interface for receiving the brake signal and applying a resistive force to the operator interface, with said brake controller system providing a first background force signal followed with a second below background force drop signal followed with a third above background stop force signal to provide a mechanical detent sensation at a target operator interface position.

2. An operator input device, as claimed in claim 1, wherein said brake controller system provides a first background electrical current level, a second electrical current level less than said background electrical current level, and a third electrical current level greater than said background electrical current level.

3. An operator input device, as claimed in claim 2, wherein said second electrical current level is less than said background electrical current level and is provided when approaching said targeted position and is not provided when receding from said targeted position.

4. An operator input device, as claimed in claim 1, wherein the operator interface includes a handle and a rotating shaft coupled to the handle.

5. An operator input device, as claimed in claim 1, wherein said detent sensation is provided with respect to a programmable position of the operator interface.

6. An operator input device, as claimed in claim 1, wherein said brake controller system provides a plurality of detent sensations at a plurality of targeted positions.

7. A vehicle, said vehicle including an operator input device for controlling said vehicle, said operator input device including an operator interface lever, said operator interface lever moveable by a vehicle operator in at least a first direction and at least a second direction about an axis, a sensor system including a sensor target, said sensor system for sensing said moveable operator interface lever, said sensor system providing an operator interface lever position signal as a function of a position of said operator interface lever, an operator interface lever controllable brake coupled to said operator interface lever, a brake controller coupled to the sensor for receiving the operator interface mechanism position signal and with the brake controller coupled to the brake for responsively transmitting a plurality of brake signals to the brake with said operator interface lever controllable brake responsively providing a plurality of resistive braking forces to said operator interface lever for opposing a force applied to the operator interface lever by the operator, said operator interface lever controllable brake providing said resistive braking forces in response to a plurality of controller brake signals, with said brake controller providing a first background force signal followed with a second below background force drop signal followed with a third above background stop force signal wherein said operator is provided with a mechanical detent sensation at a target lever location.

8. A vehicle as claimed in claim 7, wherein said operator interface lever controllable brake includes a controllable brake magnetic field generator, said controllable brake magnetic field generator generating a controllable magnetic field from a brake controller electrical current, with said first background force signal comprised of a background electrical current level, said second below background force drop signal comprised of a second electrical current level less than said background electrical current level, and said third above background stop force signal comprised of a third electrical current level greater than said background electrical current level.

9. A vehicle as claimed in claim 7, wherein said second below background force drop signal is provided when approaching said target lever location and is not provided when receding from said target lever location.

* * * * *